United States Patent [19]

Haupt

[11] Patent Number: 4,555,706
[45] Date of Patent: Nov. 26, 1985

[54] SIMULTANEOUS NULLING IN THE SUM AND DIFFERENCE PATTERNS OF A MONOPULSE RADAR ANTENNA

[76] Inventor: Randy L. Haupt, 179 Hudson Rd., Stow, Mass. 01775

[21] Appl. No.: 498,334

[22] Filed: May 26, 1983

[51] Int. Cl.[4] .......................... G01S 3/44; G01S 3/38; G01S 13/44
[52] U.S. Cl. ................................ 343/379; 343/16 M; 343/380; 343/381
[58] Field of Search .................. 343/16 M, 18 E, 379, 343/380, 381, 382, 383, 384

[56] References Cited

U.S. PATENT DOCUMENTS

| 3,803,624 | 4/1974 | Kinsey | 343/381 X |
| 4,079,379 | 3/1978 | Piesinger | 343/383 X |
| 4,214,244 | 7/1980 | McKay et al. | 343/18 E |
| 4,225,870 | 9/1980 | Marner et al. | 343/854 |
| 4,280,128 | 7/1981 | Masak | 343/381 X |
| 4,298,873 | 11/1981 | Roberts | 343/100 SA |
| 4,516,126 | 5/1985 | Masak et al. | 343/383 |

Primary Examiner—Theodore M. Blum
Assistant Examiner—Gilberto Barrón, Jr.

[57] ABSTRACT

A monopulse radar having a single set of adaptive weights shared by both sum and difference channels. The radar utilizes algorithm that effect simultaneous nulling in the sum and difference patterns of its phased array antenna. Algorithms are developed for both amplitude and phase nulling and for phase only nulling.

2 Claims, 9 Drawing Figures

SIMULTANEOUS NULLING IN THE SUM AND DIFFERENCE PATTERNS OF A MONOPULSE RADAR ANTENNA

STATEMENT OF GOVERNMENT INTEREST

The invention described herein may be manufactured and used by or for the Government for governmental purposes without the payment of any royalty thereon.

BACKGROUND OF THE INVENTION

This invention relates to monopulse radars, and in particular to means for effecting simultaneous nulling in the sum and difference patterns of a monopulse phased array antenna using one set of adaptive weights shared by both channels.

In the past few years, considerable research and development has been expended on adaptive antennas. Communications and sonar systems have reaped some of the benefits of adaptive technology while radars generally lag behind. Some of the reasons for this dichotomy are many adaptive techniques are not suited for microwave frequencies; radars have large antennas, hence more adaptive loops; and a radar has tight time constraints for detecting and tracking targets. Consequently, only a handful of radars incorporating sidelobe cancelling techniques exist today. A fully adaptive phased array antenna is not practical to build at this time.

Monopulse radars add additional problems to the adaptive processing. The problems stem from the coextistence of a sum and difference pattern. A monopulse phased array antenna uses two antenna patterns: one to detect and range a target and a second to determine a target's angular location. Most adaptive antenna research has ignored the difference pattern, even though both patterns must have a null in the direction of interference to enhance the radar's performance. Adjusting the far field sum pattern to place a null in the direction of interference will not place a null in the difference pattern too. Hence, either the sum and difference channels are adapted separately or a technique of simultaneously nulling in both channels is used. Current research has assumed the first approach is the only feasible technique, and the possibility of simultaneous nulling has been ignored.

The current state of the art relating to radar system null pattern generation techniques is illustrated by U.S. Pat. No. 4,214,244 entitled *Null Pattern Technique For Reduction of An Undesirable Interference Signal* issued to Michael W. McKay July 22, 1980, U.S. Pat. No. 4,224,870 entitled *Null Steering Antenna* issued to Gene R. Marrs Sept. 30, 1980, and U.S. Pat. No. 4,298,873 entitled *Adaptive Steerable Null Antenna Processor* issued to Eugene L. Roberts Nov. 3, 1981. Adaptive nulling in these and other prior art systems is done with two separate sets of adaptive weights: one in the sum channel and one in the difference channel. The technique of the present invention allows nulling with one set of adaptive weights shared by the two channels thereby greatly reducing hardware complexity, computer software and the cost for adaptive processing.

SUMMARY OF THE INVENTION

The invention comprehends a monopulse radar having a null pattern generating capability that can be implemented with a single set of adaptive weights that are used by both sum and difference channels.

It comprises an apparatus and technique for simultaneously placing nulls in the sum and difference patterns of the monopulse phased array antenna and includes a phased array antenna having N equally spaced elements, a computer, and feedback circuitry. Connected to each element of the phased array antenna is a variable complex weight which steers the main beam as well as generates the nulls in the far field pattern. After the variable complex weights the signal is split into a sum and a difference channel. The sum channel receives a special constant amplitude weighting, $a_n$, to lower the sidelobes of the far field pattern, while $b_n$, is the amplitude weighting in the difference channel. The computer uses a special algorithm to determine the phase settings which yield a null in the antenna pattern in the direction of the interference and then sets the variable complex weights at the calculated values.

It is a principal object of the invention to provide a new and improved means for effecting simultaneous nulling in the sum and difference pattern of a monopulse radar antenna.

It is another object of the invention to provide simultaneous nulling in the sum and difference patterns of a monopulse radar antenna using a technique that allows nulling with one set of adaptive weights shared by the two monopulse channels.

It is another object of the invention to provide means for effecting simultaneous nulling in the sum and difference patterns of a monopulse radar antenna in which hardware complexity and computer software are greatly reduced.

It is another object of the invention to provide means for effecting simultaneous nulling in the sum and difference patterns of a monopulse radar antenna that is implemented by means of an amplitude and phase nulling algorithm.

It is another object of the invention to provide means for effecting simultaneous nulling in the sum and difference patterns of a monopulse radar antenna that is implemented by means of a phase only algorithm.

These together with other objects, features and advantages of the invention will become more readily apparent from the following detailed description when taken in conjunction with the illustrative embodiment of the accompanying drawing.

DETAILED DESCRIPTION OF THE PREFERRED EMBODIMENT

The invention is a monopulse radar with null pattern generating capability and includes a phased array antenna, a computer, and feed back circuitry. The phased array is linear with equal spacing between the N elements. Behind each element is a variable complex weight which steers the main beam as well as generates the nulls in the far field antenna pattern. After the variable complex weights the signal is split into two channels. One channel is the sum channel and the other the difference channel. The sum channel receives a special constant amplitude weighting, $a_n$, to lower the sidelobes of the far field pattern. Likewise, $b_n$ is the amplitude weighting in the difference channel. Also, half the array difference channels receive a 180° phase shift. All the difference channel signals are summed to get a single output. Similarly, all the sum channels are added together to get an output. Both outputs pass through a receiver, then are digitized and sent to the computer. The computer uses a special algorithm to determine the phase settings which yield a null in the antenna shifters at the calculated values. Algoriths for both amplitude and phase nulling and for phase only nulling are provided. In order to use this technique, the direction of all the inteference sources must be known. Their angle from the antenna's boresite is given by $\phi_m (1 \leq m \leq M)$. These angles are read into the computer. The computer calculates the necessary phase settings to cancel the interference.

Figure 2:
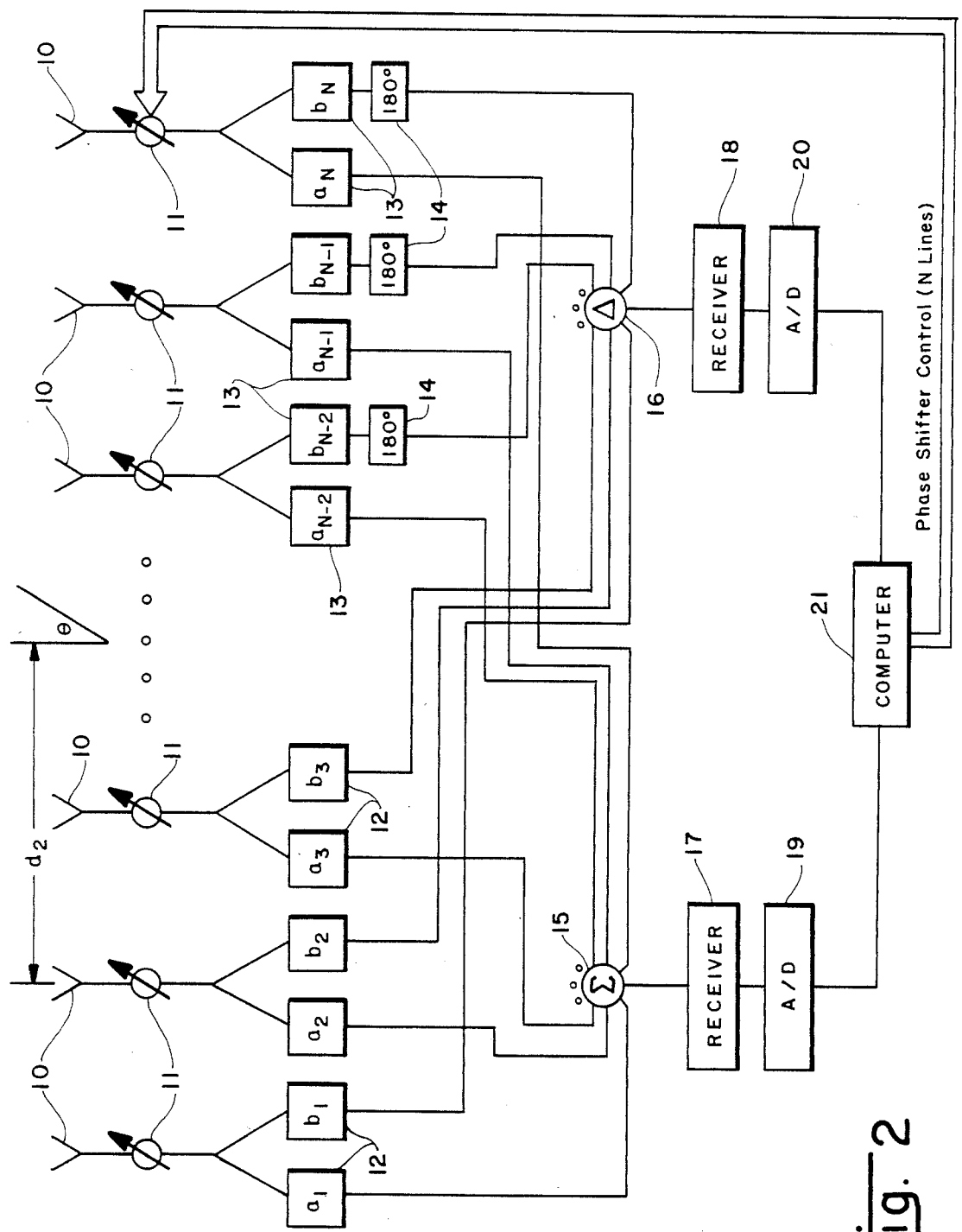
FIG. 2 is a schematic illustration of the components of a monopulse radar and linear antenna array utilized in practicing the invention.

FIG. 2 is a schematic illustration of the components of the monopulse radar utilized in the practice of the invention. They comprise antenna elements 10, variable complex weights 11, constant amplitude weight 12, 180° phase shifters 14, summing means 15, differencing means 16, receivers 17, 18, analog/digital converters 19, 20 and computer 21.

An algorithm for implementing amplitude and phase nulling is hereinafter developed.

The algorithm described is a null synthesis technique rather than a closed loop adaptive algorithm. The location of the jammers must be known for the nulls to be placed. The phase and amplitude distribution that places nulls in the direction of the jammers while minimally perturbing the adaptive weights is then computed. The weights used to generate this distribution theoretically yield a far field pattern with the desired nulls. In a practical situation, however, antenna errors significantly limit this nulling technique unless the weights are adaptively adjusted using some form of feedback. It is possible to convert this open loop nul synthesis algorithm into a closed loop adaptive algorithm to compensate for the antenna errors.

Figure 1:
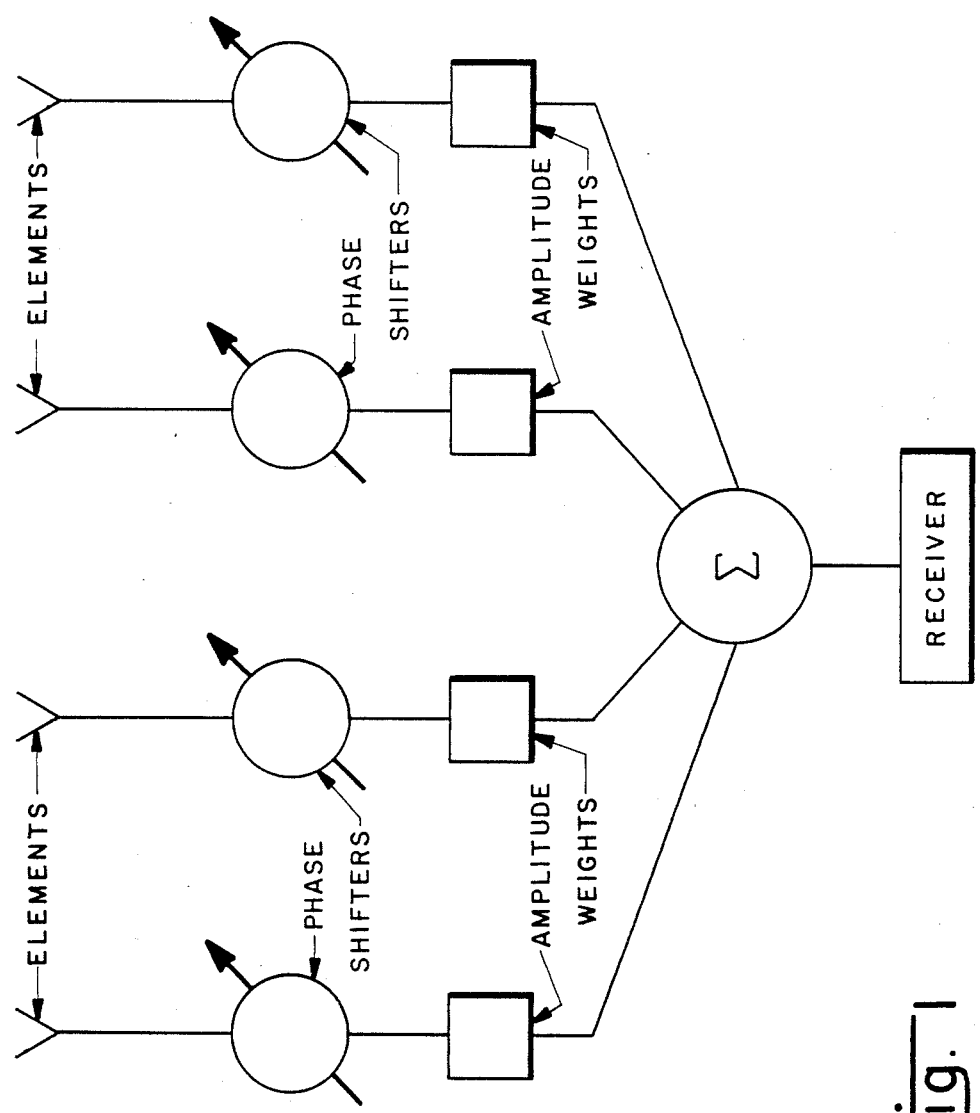
FIG. 1 is a schematic illustration of a linear array of N antenna elements.

FIG. 1 serves as the model for amplitude and phase nulling in both channels using separate weights for each channel. The quiescent weights for the sum channel are given by $$w_{on} = a_n e^{-jd_n u_s} \quad (1)$$

If the physical center of the array is also the phase center, then the phase of the signal at element n is $$\alpha_n = \frac{2\pi}{\lambda} d_o(n - N/2 - .5) \sin\theta \quad (2)$$

$$= d_n \sin\theta = d_n u \quad (3)$$

$$d_n = kd_o(n - N/2 - .5) \quad (4)$$

Assume a weight change of $\Delta w_n$ will produce the required nulls in the far field pattern. The new cascaded weights are represented by $$\Delta w_n = w_{on}(1 + \Delta w_n) \quad (5)$$

The weight change in complex form is $$\Delta w_n = \alpha_n + j\beta_n \quad (6)$$

When there are no weight changes, $\Delta w_n = 0$ and $w_n = w_{on}$. Substituting Eqs. (1) and (6) into Eq. (5) leads to $$w_n = a_n e^{-jd_n u_s}(1 + \alpha_n j\beta_n) \quad (7)$$

This new amplitude and phase distribution puts nulls in the direction of the jammers.

The far field sum pattern of the adapted antenna is given by $$S(u) = \sum_{n=1}^{N} a_n e^{-jd_n u_s} (1 + \alpha_n + j\beta_n) e^{jd_n u} \quad (8)$$

$$= \sum_{n=1}^{N} a_n e^{jd_n(u - u_s)} + \sum_{n=1}^{N} a_n(\alpha_n + j\beta_n) e^{jd_n(u - u_s)} \quad (9)$$

$$= S_o(u) + \sum_{n=1}^{N} a_n(\alpha_n + j\beta_n) e^{jd_n(u - u_s)} \quad (10)$$

$$S_o(u) = \sum_{n=1}^{N} a_n \{\cos[d_n(u - u_s)] + j \sin[d_n(u - u_s)]\} \quad (11)$$

and, assuming $a_n = a_{N+1-n}$, $$S_o(u) = \sum_{n=1}^{N} a_n \cos[d_n(u - u_s)]. \quad (12)$$

The sine terms sum to zero because $d_n$ in Eq. (4) is odd symmetric and the sine is an odd function. In general, M nulls are required in the pattern to cancel M jammers at angular locations $u_m (1 \leq m \leq M)$. The resultant far field pattern equals zero when $u = u_m$.

$$S(u_m) + \sum_{n=1}^{N} a_n(\alpha_n + j\beta_n) e^{jd_n(u_m - u_s)} = 0 \quad (13)$$

for $m = 1, 2, \ldots, M$

Figure 3:
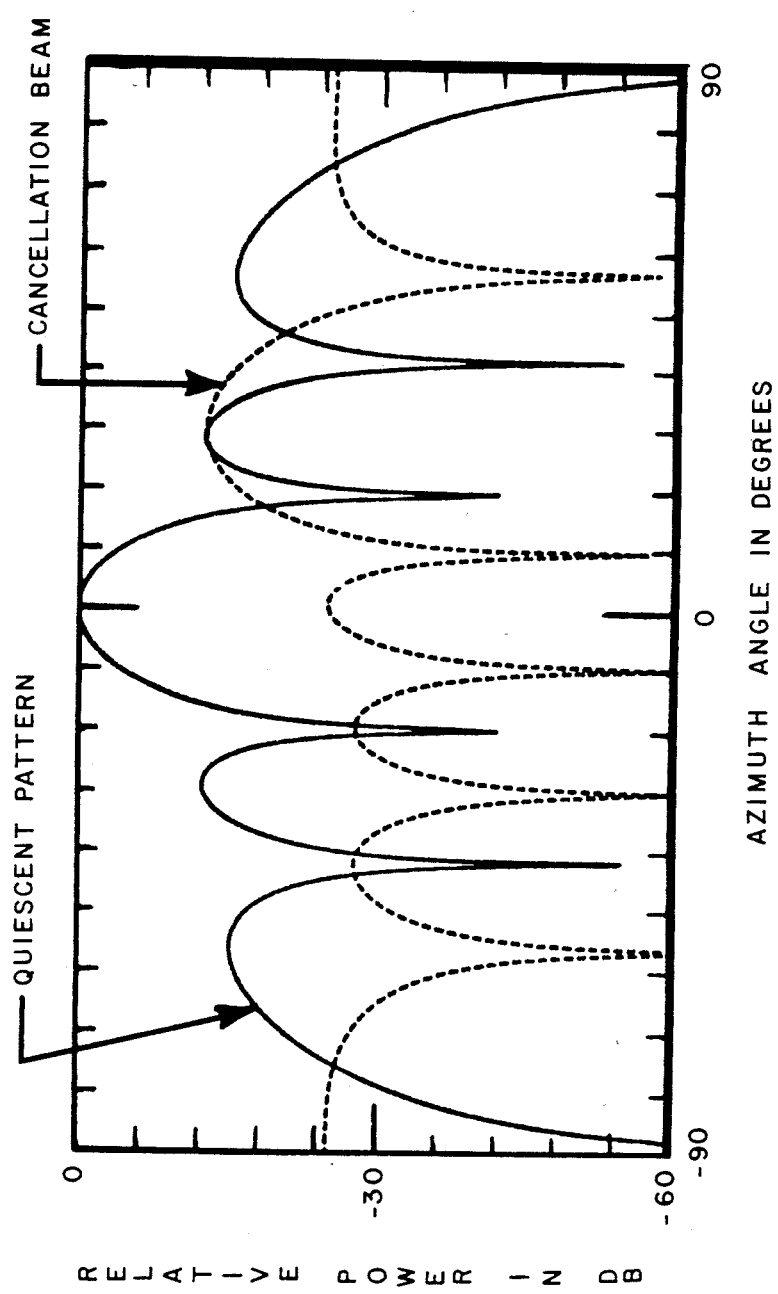
FIG. 3 is a graph illustrating cancellation beam and quiescent patterns.
Figure 4:
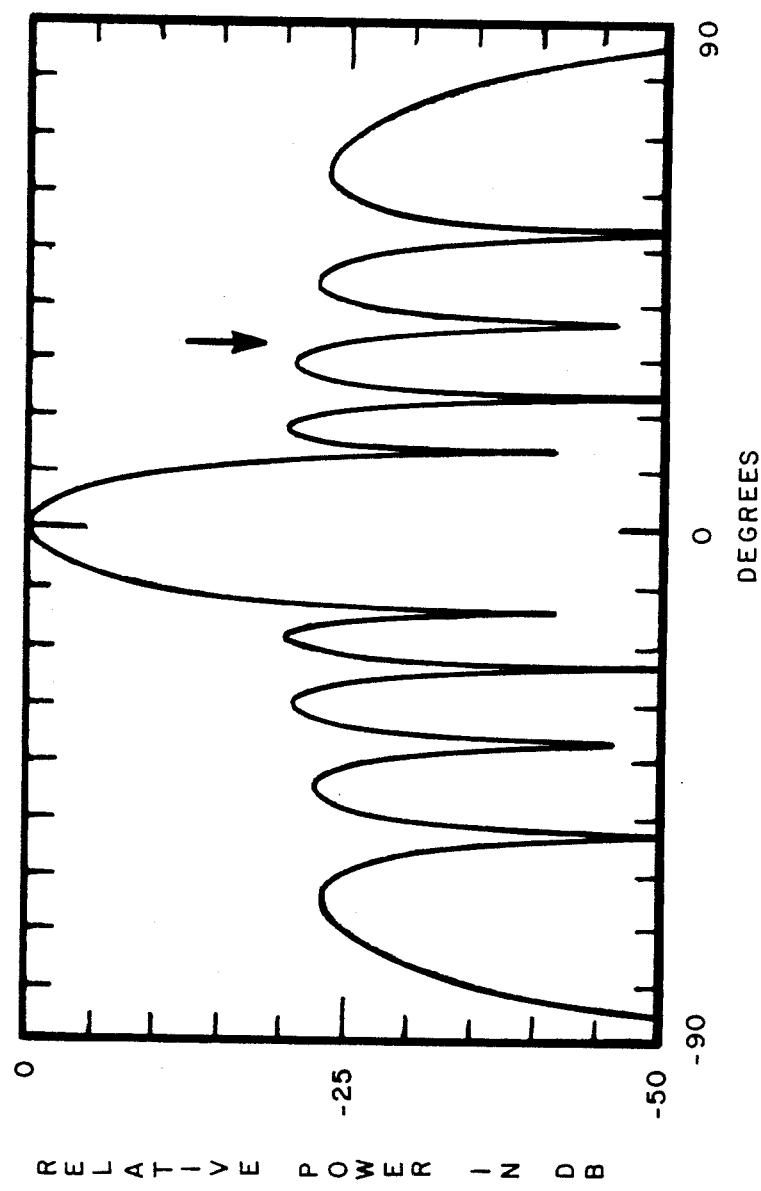
FIG. 4 is a graph illustrating a quiescent far field sum pattern.
Figure 5:
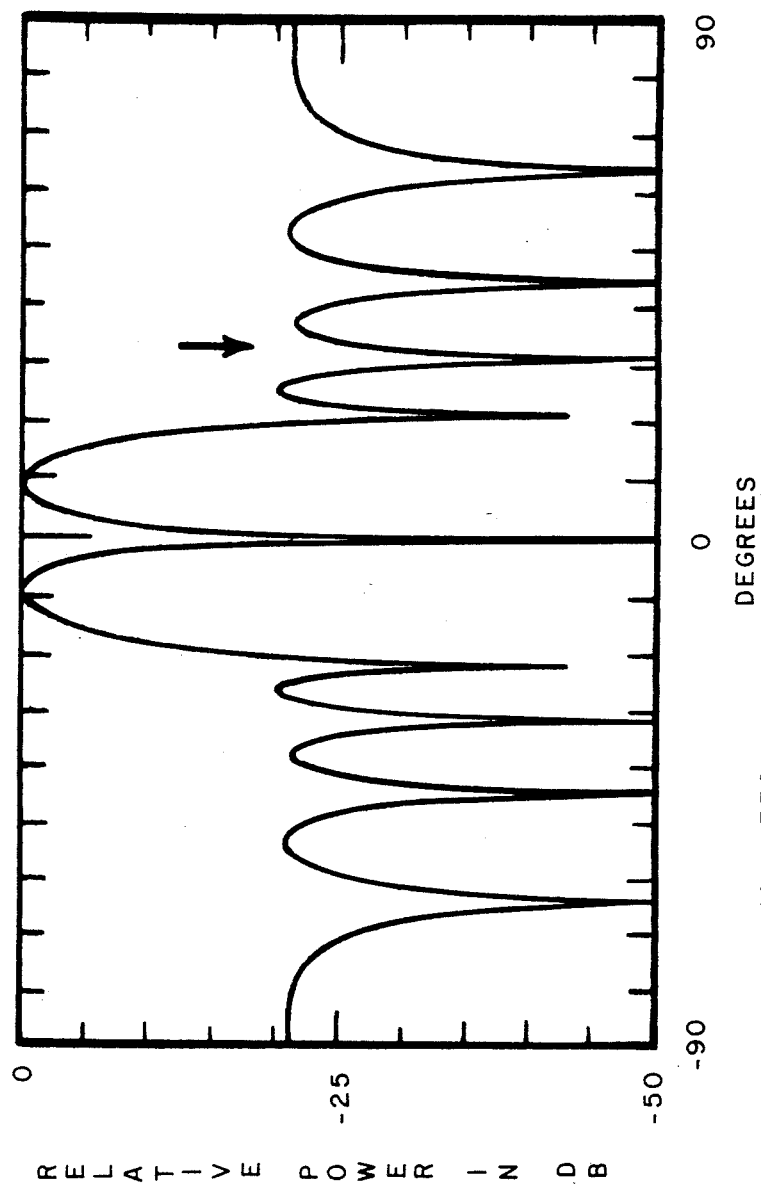
FIG. 5 is a graph illustrating a quiescent far field difference pattern.
Figure 6:
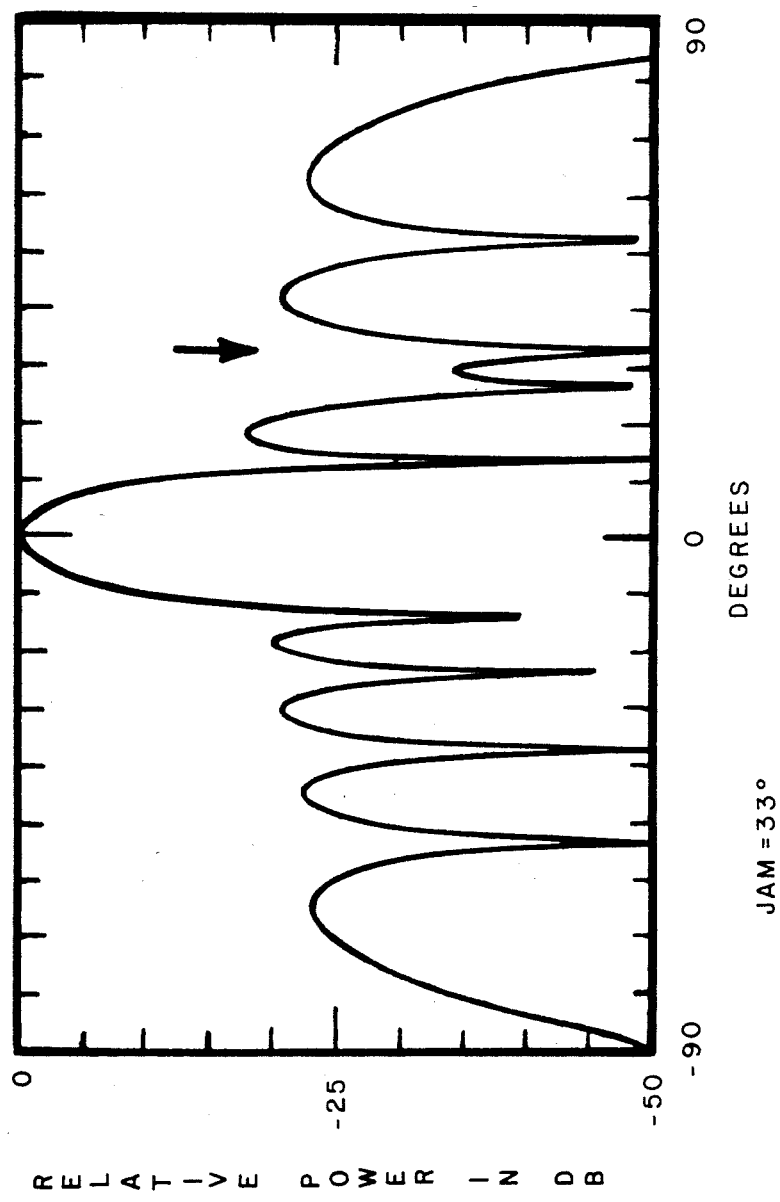
FIG. 6 is a graph illustrating a far field sum pattern with null at 33 degrees.
Figure 7:
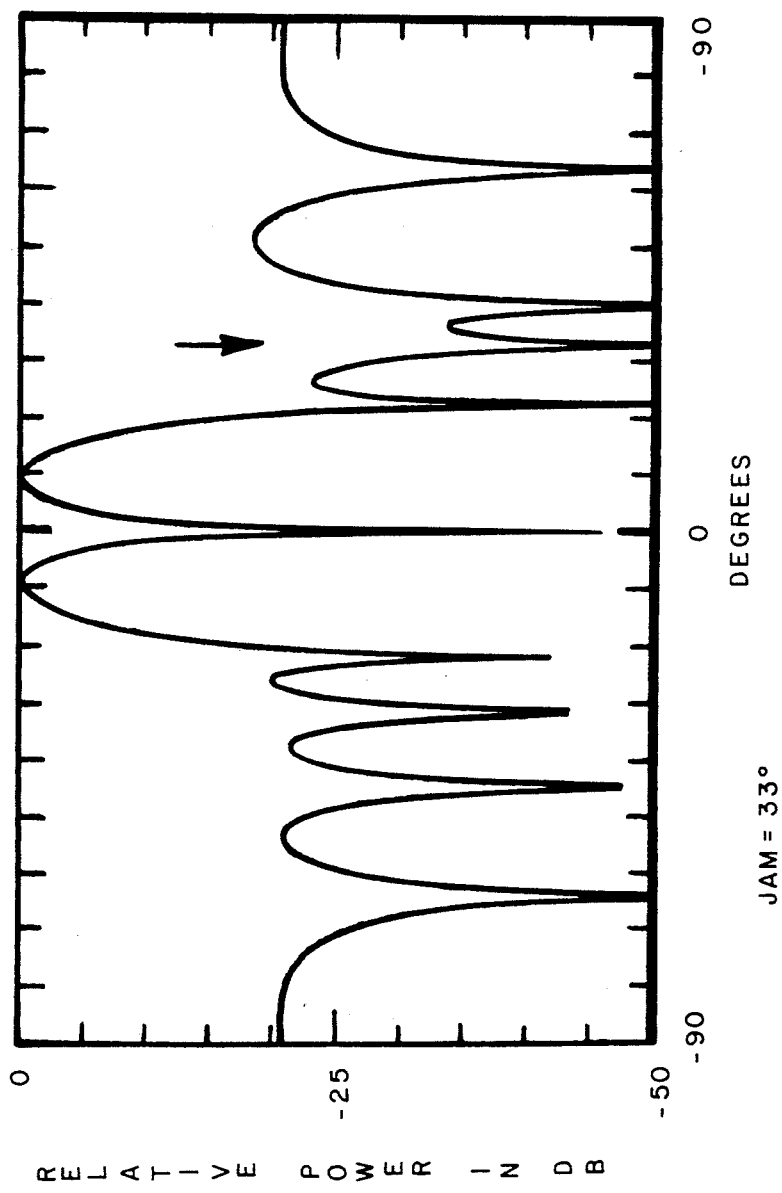
FIG. 7 is a graph illustrating a far field difference pattern null at 33 degrees.

This system of equations may be looked at as the sum of the quiescent pattern and M cancellation beams. Each cancellation beam matches the quiescent pattern's amplitude in the jammer directions, but is opposite in phase. Therefore, the sum of the two quantities equals zero at $u_m$. The process is pictorially represented in FIG. 3.

The above system of equations has M equations and N unknowns. To determine the values of $\Delta w_n$, Eq. (13) is solved for $\alpha_n$ and $v_n$. Shore and Steyskai have shown that minimizing the quantity $$\sum_{n=1}^{N} (\alpha_n^2 + \beta_n^2)$$

minimizes, in the least mean square sense, the adaptive weight perturbations. This is a very desirable characteristic, because the nulled pattern changes very little as possible from its quiescent form.

To solve the system of equations, we put it into matrix form.

$$AX = B \qquad (14)$$

where $$A = \begin{bmatrix} a_1 e^{jd_1(u_1-u_s)} & a_2 e^{jd_2(u_1-u_s)} & \ldots & a_N e^{jd_N(u_1-u_s)} \\ a_1 e^{jd_1(u_2-u_s)} & a_2 e^{jd_2(u_2-u_s)} & \ldots & a_N e^{jd_N(u_2-u_s)} \\ \vdots & \vdots & & \vdots \\ a_1 e^{jd_1(u_M-u_s)} & a_2 e^{jd_2(u_M-u_s)} & \ldots & a_N e^{jd_N(u_M-u_s)} \end{bmatrix} \quad (15)$$

$$X = [\alpha_1 + j\beta_1 \ \alpha_2 + j\beta_2 \ldots \alpha_N + j\beta_N]^T \qquad (16)$$

$$B = -[S_o(u_1) \ S_o(u_2) \ldots S_o(u_M)]^T \qquad (17)$$

where $[\ ]^T$ represents matrix transpose. The lease squares solution to $AX = B$ is $$A^+ A X = A^+ B \qquad (18)$$

where $(\ )^+$ represents conjugate matrix transpose $$(A^+ A)^{-1}(A^+ A)X = (A^+ A)^{-1} A^+ B \qquad (19)$$

$$X = A^+ (AA^+)^{-1} B \qquad (20)$$

Since it can be shown that $(A^+A)^{-1}A^+ = A^+(AA^+)^{-1}$.

The product of $AA^+$ is a matrix whose elements are $$(AA^+)_{km} = \sum_{n=1}^{N} a_n e^{jd_n(u_k-u_s)} a_n e^{jd_n(u_s-u_m)} \qquad (21)$$

$$= \sum_{n=1}^{N} a_n^2 e^{jd_n(u_k-u_m)} \qquad (22)$$

$$= \sum_{n=1}^{N} a_n^2 \{\cos[d_n(u_k - u_m)] + j\sin[d_n(u_k - u_m)]\} \qquad (23)$$

$$= \sum_{n=1}^{N} a_n^2 \cos[d_n(u_k - u_m)] \text{ for } k, m = 2, \ldots, M \qquad (24)$$

The sine term sums to zero because $d_n$ is odd symmetric and sine is an odd function, and it has been assumed $a_n = a_{N+1-n}$.

Eq. (20) may be written as $$X = A^+ Y \qquad (25)$$

where $$Y = (AA^+)^{-1} B \qquad (26)$$

The vector Y is found by inverting $(AA^+)$ and postmultiplying the result by the vector B. Substituting Y into Eq. (20) gives $$\alpha_n + j\beta_n = \sum_{m=1}^{M} y_m a_n \{\cos[d_n(u_s - u_m)] + j\sin[d_n(u_s - u_m)]\} \qquad (27)$$

Next, the real and imaginary parts are equated $$\alpha_n = \sum_{m=1}^{M} y_m a_n \cos[d_n(u_s - u_m)] \qquad (28)$$

$$\beta_n = \sum_{m=1}^{M} y_m a_n \sin[d_n(u_s - u_m)] \qquad (29)$$

The derived weight changes, $\Delta w_n = \alpha_n + j\beta_n$, are used to adjust the complex array weights to generate the nulls in the pattern. Using Eq. (5) the adapted weights may be expressed as $$w_n = w_{on} \delta_n \exp[j\phi_n]$$

where $$\gamma_n = [(\alpha_n + 1)^2 + \beta_n^2]^{\frac{1}{2}} \qquad (30)$$

$$\phi_n = \tan^{-1}[\beta_n/(\alpha_n + 1)] \qquad (31)$$

The nulling technique can be extended to include difference patterns. Since the sum pattern is an even function and the difference pattern an odd function, the derivations require modification. Weight perturbations that create a desired null in the sum pattern do not create a null in the difference pattern, even if the amplitude distributions are uniform.

One way of producing a difference pattern is shown in FIG. 1 where half the element signals receive a 180° phase shift. The quiescent difference channel weights are $$w_{on} = b_n e^{-jd_n u_s} \qquad (32)$$

As before, the weight change $w_n$ produce a null in a desired direction.

$$w_n = w_{on}(1 + \Delta w_n) = b_n e^{-jd_n u_s}(1 + \alpha_n + j\beta_n) \qquad (34)$$

These weights have a far field pattern represented by $$D(u) = \sum_{n=1}^{N} b_n e^{jd_n(u-u_s)} + \sum_{n=1}^{N} b_n e^{-jd_n u_s}(\alpha_n + j\beta_n)e^{jd_n u} \qquad (35)$$

$$= D_o(u_m) + \sum_{n=1}^{N} b_n(\alpha_n + j\beta_n)e^{jd_n(u-u_s)} \qquad (36)$$

The quiescent far field pattern is $$D_o(u) \sum_{n=1}^{N} b_n \{\cos[d_n(u - u_s)] + j\sin[d_n(u - u_s)]\} \qquad (37)$$

D(u) is zero in the direction of the jammers $$\sum_{n=1}^{N} (\alpha_n + j\beta_n) b_n e^{jd_n(u_m-u_s)} = -D_o(u_m) = \qquad (38)$$

$$\sum_{n=1}^{N} \{b_n \cos[d_n(u_m - u_s)] + j\sin[d_n(u_m - u_s)]\}$$

Because $b_n$ is an odd function $$-\sum_{n=1}^{N} b_n \cos[d_n(u_m - u_s)] = 0. \quad (39)$$

Eq. (38) in matrix form is $AX=\beta$ where $$A = \begin{bmatrix} b_1 e^{jd1(u1-us)} & b_2 e^{jd2(u1-us)} & \cdots & b_N e^{jdN(u1-us)} \\ b_1 e^{jd1(u2-us)} & b_2 e^{jd2(u2-us)} & \cdots & b_N e^{jdN(u2-us)} \\ \vdots & \vdots & & \vdots \\ b_1 e^{jd1(uM-us)} & b_2 e^{jd2(uM-us)} & \cdots & b_N e^{jdN(uM-us)} \end{bmatrix} \quad (40)$$

$$B = -[D_o(u_1), D_o(u_2), \ldots, D_o(u_M)]^T \quad (41)$$

$$X = [\alpha_1 + j\beta_1, \alpha_2 + j\beta_2, \ldots \alpha_N + j\beta_N]^T \quad (42)$$

The method of least square leads to a solution $$X = A^+(AA^+)^{-1}B \quad (43)$$

$$= A^+C \quad (44)$$

$$\alpha_n + j\beta_n = \sum_{m=1}^{M} c_m b_n e^{jd_n(u_m - u_s)} \quad (45)$$

The variable $c_m$ is an element of the vector C. The matrix $(AA^+)$ contains the elements $$(AA^+)_{km} = \sum_{n=1}^{N} b_n e^{jd_n(u_m - u_s)} b_n e^{jd(u_k - u_s)} \quad (46)$$

$$= \sum_{n=1}^{N} b_n^2 e^{jd_n(u_m - u_k)} \quad (47)$$

$$= \sum_{n=1}^{N} b_n^2 \{\cos[d_n(u_m - u_k)] + j\sin[d_n u_m - u_k)]\} \quad (48)$$

The sine terms sum to zero leaving $$(AA^+)_{km} = \sum_{n=1}^{N} b_n^2 \cos[d_n(u_k - u_m)] \quad (49)$$

Rewriting Equation 45 results in $$\alpha_n + j\beta_n = \sum_{m=1}^{M} c_m b_n \{\cos[d_n(u_m - u_s)] + j\sin[d_n(u_m - u_s)]\} \quad (50)$$

Finally, equating the real and imaginary parts of both sides of the equation produces the weight perturbations, $$\alpha_n = \sum_{m=1}^{M} c_m b_n \cos[d_n(u_m - u_s)] \quad (51)$$

$$\beta_n = \sum_{m=1}^{M} c_m b_n \sin[d_n(u_m - u_s)]. \quad (52)$$

The phase-amplitude forms of the complex perturbations are used to adjust the variable complex weights.

Null synthesis for sum and difference patterns in the manner previously described requires two separate sets of adaptive weights. Implementing this technique on a monopulse radar antenna requires N complex weights in the sum channel and N complex weights in the difference channel as shown in FIG. 1. The following pages describe a technique that allows the sum and difference channels to share one set of complex weights (FIG. 2). The adaptive weight appears before the element signal is split into the sum and difference channels. Incorporating such a technique into an adaptive antenna would significantly reduce the cost and complexity of the system.

A linear array with N elements has N complex weights and N−1 degrees of freedom. For every jammer, the sum channel uses one degree of freedom and the difference channel another. The drawback to this technique is that the degrees of freedom available for nulling in the sum and difference channels are cut in half, so that (N−1)/2 degrees of freedom are available.

Eqs. (13) and (38) still hold true, but now they must be solved simultaneously.

$$\sum_{n=1}^{N} (\alpha_n + j\beta_n) a_n e^{jd_n(u_m - u_s)} = \sum_{n=1}^{N} a_n \cos[(d_n(u_m - u_s)] \quad (53)$$

$$\sum_{n=1}^{N} (\alpha_n + j\beta_n) b_n e^{jd_n(u_m - u_s)} = j\sum_{n=1}^{N} b_n \sin[(d_n(u_m - u_s)] \quad (54)$$

This system of equations may be put in the form $AX=B$ $$A = \begin{bmatrix} a_1 e^{jd1(u1-us)} & \cdots & a_N e^{jdN(u1-us)} \\ \vdots & & \vdots \\ a_1 e^{jd1(uM-us)} & \cdots & a_2 e^{jdN(uM-us)} \\ b_1 e^{jd1(u1-us)} & \cdots & b_N e^{jdN(u1-us)} \\ \vdots & & \vdots \\ b_1 e^{jd1(uM-us)} & \cdots & b_2 e^{jdN(uM-us)} \end{bmatrix} \quad (55)$$

$$X = \begin{bmatrix} \alpha_1 + j\beta_1 \\ \alpha_2 + j\beta_2 \\ \vdots \\ \alpha_N + j\beta_N \end{bmatrix} \quad (56)$$

$$B = \begin{bmatrix} \sum_{n=1}^{N} a_n \cos d_n(u_1 u_s) \\ \vdots \\ \sum_{n=1}^{N} a_n \cos d_n(u_M - u_s) \\ \sum_{n=1}^{N} b_n \sin d_n(u_1 - u_s) \\ \vdots \\ j \sum_{n=1}^{N} b_n \sin d_n(u_M - u_s) \end{bmatrix} \quad (57)$$

The least mean square solution to the equation is $$X = A^+(AA^+)B \quad (58)$$

To make the computations easier to follow, the A matrix is partitioned.

$$A = \begin{bmatrix} J \\ K \end{bmatrix} \tag{59}$$

$$(AA^+) = \begin{bmatrix} J \\ K \end{bmatrix} [J^* \ K^*] \tag{60}$$

$$= \begin{bmatrix} JJ^* & JK^* \\ KJ^* & KK^* \end{bmatrix} \tag{61}$$

The elements for $(AA^+)$ are $$(AA^+)_{j,k} = \sum_n a_n^2 e^{jd_n(u_j - u_k)} \tag{62}$$

$$(AA^+)_{j+M,k} = \sum_n a_n b_n e^{jd_n(u_j - u_k)} \tag{63}$$

$$(AA^+)_{j,k+M} = \sum_n a_n b_n e^{jd_n(u_j - u_k)} \tag{64}$$

$$(AA^+)_{j+M,k+M} = \sum_n b_n^2 e^{jd_n(u_j - u_k)} \tag{65}$$

Inverting the complex matrix $(AA^+)$ and multiplying it by Y results in a $2M \times 1$ complex matrix R. The weight perturbations are $$\alpha_n + j\beta_n = A^+ R \tag{66}$$

$$\begin{bmatrix} a_1 e^{-jd_1(u_1-u_s)} & \cdots & a_1 e^{-jd_1(u_M-u_s)} & b_1 e^{-jd_1(u_1-u_s)} & \cdots & b_1 e^{-jd_1(u_M-u_s)} \\ \vdots & & \vdots & \vdots & & \vdots \\ a_N e^{-jd_N(u_1-u_s)} & \cdots & a_N e^{-jd_N(u_M-u_s)} & b_N e^{-jd_N(u_1-u_s)} & \cdots & b_N e^{-jd_N(u_M-u_s)} \end{bmatrix} \begin{bmatrix} f_1 + jg_1 \\ \vdots \\ f_{2M} + jg_{2M} \end{bmatrix} \tag{67}$$

$$= \sum_{m=1}^{M} (a_n f_m e^{-jd_n(u_m-u_s)} + ja_n g_m e^{-jd_n(u_m-u_s)} + b_n f_{m+M} e^{-jd_n(u_m-u_s)} + jb_n g_{m+M} e^{-jd_n(u_m-u_s)}) \tag{68}$$

$$\alpha_n = \sum_{m=1}^{M} \{a_n f_m \cos d_n(u_m - u_s) + a_n g_m \sin d_n(u_m - u_s) + b_n f_{m+M} \cos d_n(u_m - u_s) + b_n g_{m+M} \sin d_n(u_m - u_s)\} \tag{69}$$

$$\beta_n = \sum_{m=1}^{M} \{a_n f_m \sin d_n(u_m - u_s) + a_n g_m \cos d_n(u_m - u_s) + b_n f_{m+M} \sin d_n(u_m - u_s) + b_n g_{m+M} \cos d_n(u_m - u_s)\} \tag{70}$$

Equations (69) and (70) are rewritten in matrix notation as:

$$\alpha_n = Re\{A^+(AA^+)^{-1}B\} \tag{71}$$

$$\beta_n = Im\{A^+(AA^+)^{-1}B\} \tag{72}$$

In another embodiment of the invention nulling is accomplished by means of phase only nulling techniques.

Nulling with phase shifters is much more desirable than nulling with complex weights. The hardware for phase only nulling is less complicated. Adjusting the signal amplitude requires an attenuator or two phase shifters in a bridge circuit for each element. The extra losses, mismatch, and cost of the amplitude control discourages its use. Also, phased arrays usually have only phase shifters and incorporation of amplitude weighting requires modifications to existing antennas. An adaptive technique that uses phase control rather than phase and amplitude control can more easily be implemented on existing phased arrays.

Phase only nulling in the sum channel of a low sidelobe antenna is discussed in the literature. The technique closely follows the process used in phase and amplitude nulling described above. The quiescent sum channel weights are given by Eq. (1). To put nulls in the antenna pattern, a phase shift of $\phi_n$ is given to each element.

$$w_n = a_n e^{-jd_n u_s} e^{j\phi_n} \tag{73}$$

$$\simeq a_n e^{-jd_n u_s}(1 + j\phi_n), \ \phi_n << 1. \tag{74}$$

The approximation $e^{j\phi_n} \simeq 1 + j\phi_n$ is necessary to solve the problem, but it makes the answer approximate. Fortunately, this approximation works very well for low sidelobe antennas.

The far field pattern of these weights is calculated from $$S(u) = \sum_{n=1}^{N} a_n e^{-jd_n u_s}(1 + j\phi_n)e^{jd_n u} \tag{75}$$

$$= \sum_{n=1}^{N} a_n e^{jd_n u_s} + j \sum_{n=1}^{N} a_n \phi_n e^{jd_n(u-u_s)}. \tag{76}$$

At the jammer angles, the pattern goes to zero $$S(u_m) = \sum_{n=1}^{N} a_n e^{jd_n(u_m-u_s)} + j \sum_{n=1}^{N} a_n \phi_n e^{jd_n(u_m-u_s)} = 0 \tag{77}$$

$$j = \sum_{n=1}^{N} a_n \phi_n \{\cos[d_n(u_m - u_s)] + j\sin[d_n(u_m - u_s)]. \tag{78}$$

$$= \sum_{n=1}^{N} a_n \{\cos[d_n(u_m - u_s)] + j\sin[d_n(u_m - u_s)]\}$$

Next, equating the real and imaginary parts, assuming $a_n$ real $$\sum_{n=1}^{N} a_n \phi_n \sin(d_n(u_m - u_s)) = \sum_{n=1}^{N} a_n \cos(d_n(u_n - u_s)) \tag{79}$$

-continued $$= \sum_{n=1}^{N} a_n \phi_n \cos(d_n(u_m - u_s)) = \sum_{n=1}^{N} a_n \sin(d_n(u_n - u_s)) \quad (80)$$

The second equation equals zero because the sine is an odd function and $d_n$ has odd symmetry, and $a_{N+1-n} = a_n$ has been assumed.

Equation (79) can be put into the matrix form $AK = B$ where $$A = \begin{bmatrix} a_1 \sin d_1(u_1 - u_s) & \ldots & a_N \sin d_N(u_1 - u_s) \\ \vdots & & \vdots \\ a_1 \sin d_1(u_M - u_s) & \ldots & a_N \sin d_N(u_M - u_s) \end{bmatrix} \quad (81)$$

$$X = \begin{bmatrix} o_1 \\ o_2 \\ \vdots \\ o_N \end{bmatrix} \quad (82)$$

$$B = \begin{bmatrix} \sum_{n=1}^{N} a_n \cos d_n(u_1 - u_s) \\ \vdots \\ \sum_{n=1}^{N} a_n \cos d_n(u_M - u_s) \end{bmatrix} \quad (83)$$

The unknown phase shifters are obtained from the method of least squares.

$$X = A^T C \quad (84)$$

$$C = (AA^T)^{-1} B \quad (85)$$

$$(AA^T)_{jk} = \sum_n a_n^2 \sin[(d_n(u_j - u_s)] \sin[d_n(u_k - u_s)] \quad (86)$$

$$\phi_n = \sum_{m=1}^{M} c_m a_n \sin[d_n(u_m - u_s)]. \quad (87)$$

The variable $c_m$ is the mth element in the vector C. Nulls are made in the sum pattern in the directions of the jammers when $\phi_n$ is applied to the phase shifters.

The derivation of the phase shifts for the difference channel follows that of the sum channel.

$$w_n = b_n e^{-jd_n u_s} e^{j\phi_n} \quad (88)$$

$$b_n e^{-jd_n u_s}(1 + j\phi_n).$$

The far field difference pattern is $$D(u) = \sum_{n=1}^{N} b_n(1 + j\phi_n) e^{jd_n(u - u_s)} \quad (89)$$

$D(u)$ equals zero when $u = u_m$.

$$j \sum_{n=1}^{N} b_n \phi_n \{\cos[d_n(u_m - u_s)] + j\sin[d_n(u_m - u_s)]\} = \quad (90)$$

-continued $$- \sum_{n=1}^{N} b_n \{\cos[d_n(u_m - u_s)] + j\sin[d_n(u_m - u_s)]\}.$$

Equating the real and imaginary parts of the equation, $$\sum_{n=1}^{N} b_n \phi_n \cos[d_n(u_m - u_s)] = -b_n \sin[d_n(u_m - u_s)]. \quad (91)$$

$$\sum_{n=1}^{N} b_n \phi_n \sin[d_n(u_m - u_s)] = -b_n \cos[d_n u_m - u_s)]. \quad (92)$$

Eq. (91) equals zero.

The remaining system of equations can be solved using the method of least squares.

$$AX = B \quad (93)$$
$$X = A^T(AA^T)^{-1} B \quad (94)$$
$$= A^T C \quad (95)$$

$$A = \begin{bmatrix} b_1 \cos[d_1(u_1 - u_s)] & \ldots & b_N \cos[d_N(u_1 - u_s)] \\ \vdots & & \vdots \\ b_1 \cos[d_1(u_M - u_s)] & \ldots & b_N \cos[d_N(u_M - u_s)] \end{bmatrix} \quad (96)$$

$$B = \begin{bmatrix} -\sum_{n=1}^{N} b_n \sin[d_n(u_1 - u_s)] \\ \vdots \\ -\sum_{n=1}^{N} b_n \sin[d_n(u_M - u_s)] \end{bmatrix} \quad (97)$$

The X vector contains the values $\phi_n$ and C has elements $c_m$.

$$\phi_n = \sum_{m=1}^{M} c_m b_n \cos[d_n(u_m - u_s)]$$

These phase shifters produce nulls in the difference pattern in the directions of interference.

Normally, both the sum and difference channels share one set of phase shifters. The preceding nulling techniques place nulls in the sum pattern or the difference pattern, but not both. To place the nulls in both far field patterns, the conditions of the two equations must be met. Thus, Eqs. (78) and (90) remain unchanged, but in this case they are solved simultaneously.

The elements of the matrix equation $AX = B$ are $$A = \begin{bmatrix} a_1 \sin[d_1(u_1 - u_s)] & \ldots & a_N \sin[d_N(u_1 - u_s)] \\ \vdots & & \vdots \\ a_1 \sin[d_1(u_M - u_s)] & \ldots & a_N \sin[d_N(u_M - u_s)] \\ b_1 \cos[d_1(u_1 - u_s)] & \ldots & a_N \cos[d_N(u_1 - u_s)] \\ \vdots & & \vdots \\ b_1 \cos[d_1(u_M - u_s)] & \ldots & b_N \cos[d_N(u_M - u_s)] \end{bmatrix} \quad (98)$$

$$X = \begin{bmatrix} \phi_1 \\ \phi_2 \\ \vdots \\ \phi_N \end{bmatrix} \quad (99)$$

$$\sum_{n=1}^{N} a_n \cos[d_n(u_1 - u_s)] \quad (100)$$

$$B = \begin{bmatrix} \sum_{n=1}^{N} a_n \cos[d_n(u_m - u_s)] \\ -\sum_{n=1}^{N} b_n \sin[d_n(u_1 - u_s)] \\ \vdots \\ -\sum_{n=1}^{N} b_n \sin[d_n(u_M - u_s)] \end{bmatrix}$$

The least squares solution is $$X = A^T C \quad (101)$$

$$C = (AA^T)^{-1} B \quad (102)$$

$$(AA^T)_{i,j} = \sum_{n=1}^{N} a_n^2 \sin[d_n(u_i - u_s)] \sin[d_n(u_j - u_s)], \, i, j \leq M \quad (103)$$

$$(AA^T)_{i+M,j} = \sum_{n=1}^{N} a_n b_n \sin[d_n(u_i - u_s)] \cos[d_n(u_j - u_s)] \quad (104)$$

$$(AA^T)_{i,j+M} = \sum_{n=1}^{N} a_n b_n \cos[d_n(u_i - u_s)] \sin[d_n(u_j - u_s)] \quad (105)$$

$$(AA^T)_{i+M,j+M} = \sum_{n=1}^{N} b_n^2 \cos[d_n(u_i - u_s)] \sin[d_n(u_j - u_s)] \quad (106)$$

$$o_n = \sum_{m=1}^{M} c_m a_n \sin[d_n(u_m - u_s)] + \sum_{m=M+1}^{2M} c_m b_n \cos[d_n(u_m - u_s)] \quad (107)$$

The variables $c_m$ are elements of the matrix C. These values of $o_n$ simultaneously generate a null in the sum and difference patterns in the direction of interference.

By way of example, the low sidelobe synthesis techniques and nulling algorithm have been programmed in BASIC and implemented on a Tektronix 4052 computer. The computer included a Tektronix 4663 plotter which drew all plots shown in FIGS. 4-7.

Figure 8:
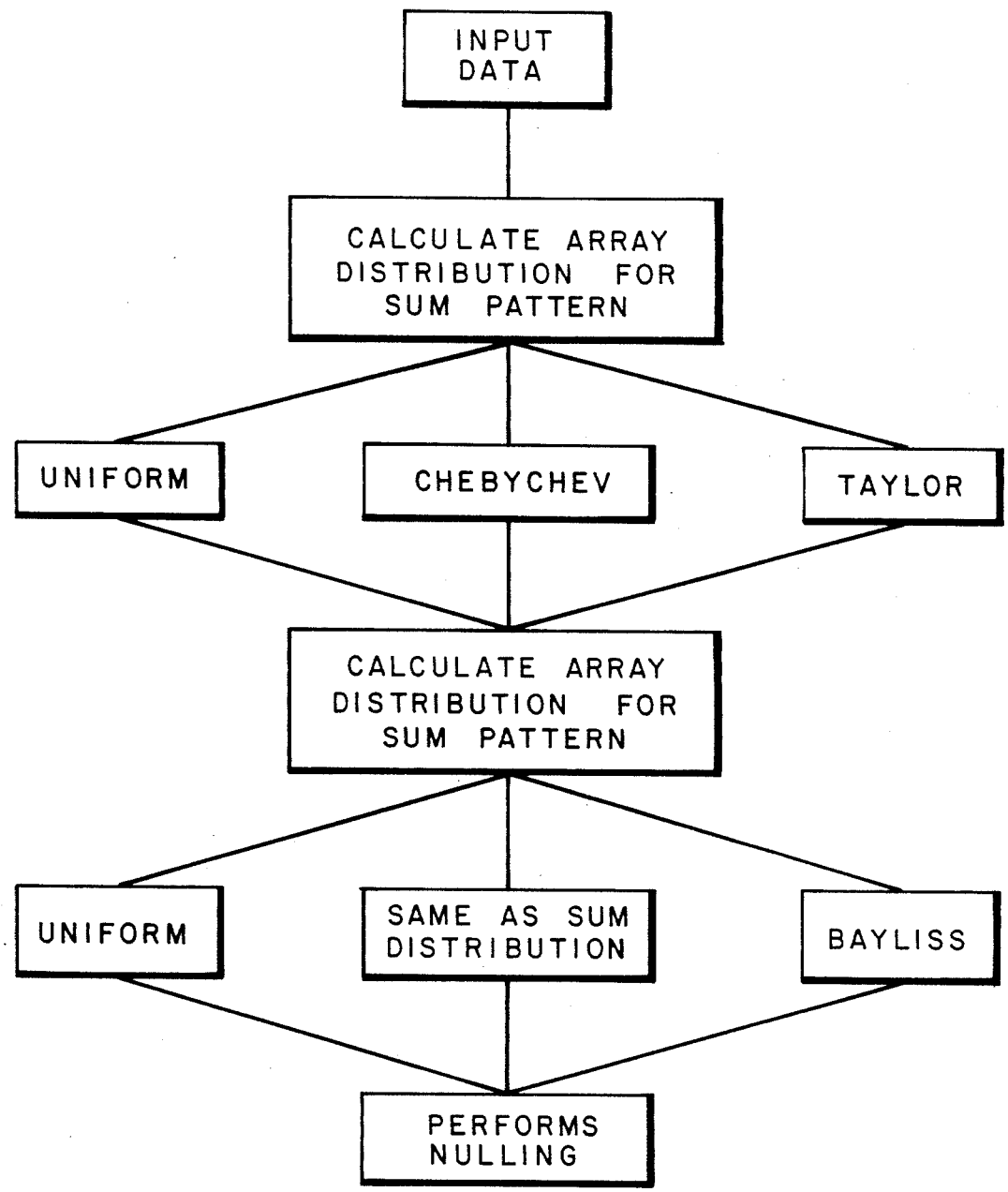
FIGS. 8 and 9 comprise a flow chart for the null forming algorithm of the invention.
Figure 9:
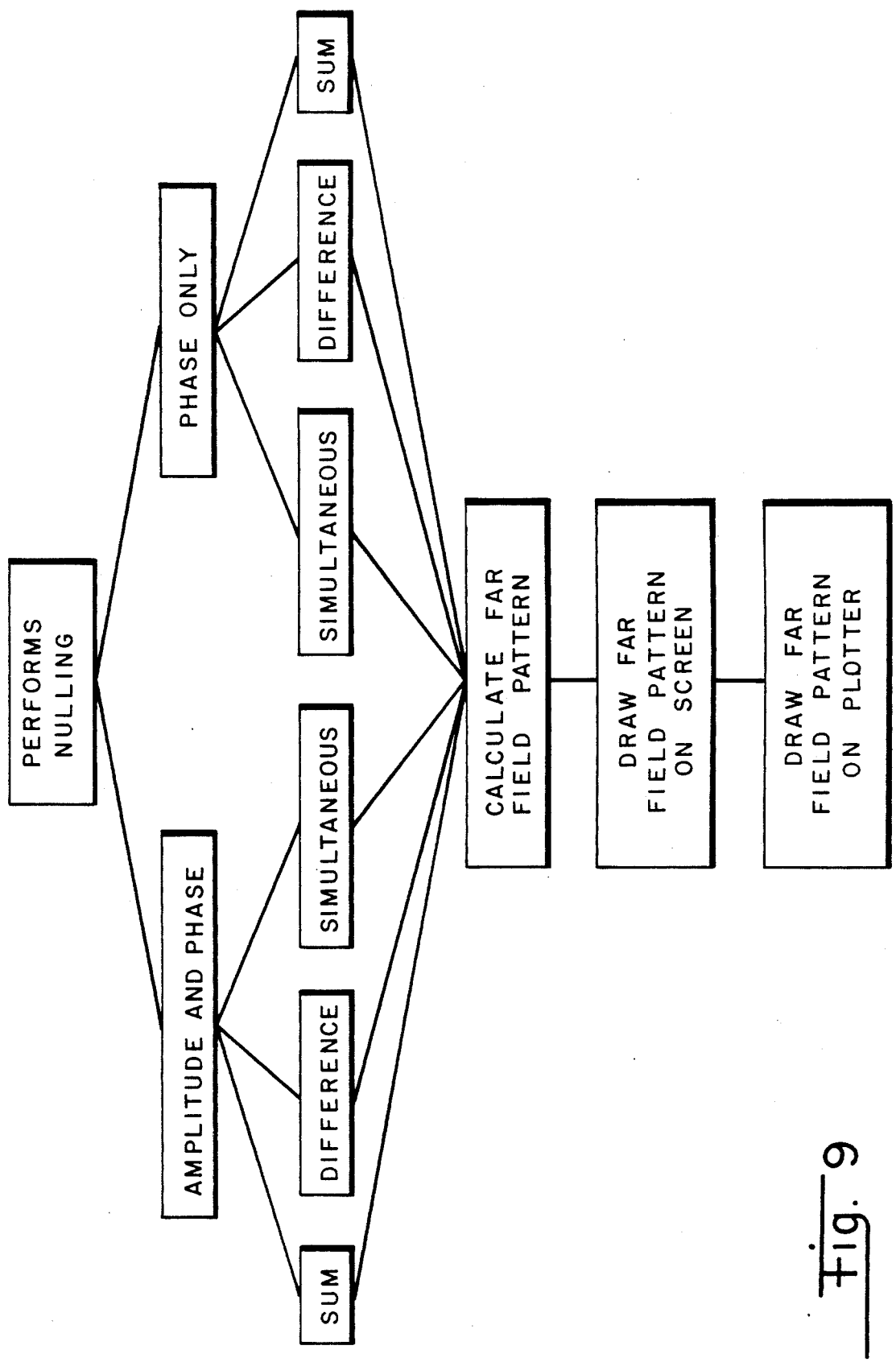

FIG. 8 shows a block diagram of the computer algorithm. First, data such as the number of elements, element spacing, etc. are entered on the keyboard. Next, the program calculates the amplitude weights for either a uniform, Taylor, a Cheybchev sum distribution and for either a uniform or Bayliss difference distribution. This part of the program models a low sidelobe synthesis technique. Multiplying the zero factors together to obtain the polynomial p(s) is very inefficient. Only linear array distributions with up to 30 elements can be derived without taking excessive computer time.

After calculating the desired array distribution, the program enters into the nulling routines. The routine offers six different choices:

(1) Amplitude & Phase Nulling in Sum Channel
(2) Amplitude & Phase Nulling in Difference Channel
(3) Amplitude and Phase Nulling Simultaneously
(4) Phase only nulling in sum channel
(5) Phase only nulling in difference channel
(6) Phase only nulling simultaneously The routine changes the quiescent sum and difference channels for one of the above choices. Both channels are assumed to share one set of adaptive weights. In cases 1 and 4 the adaptive weights are adjusted to place nulls in the sum channel. The difference channel receives the exact same weight change. For cases 2 and 5 the reverse holds true. In cases 3 and 6 the adaptive weights are adjusted to yield nulls simultaneously in the sum and difference channels. When the nulling routine is completed, the program stores the quiescent, adapted, and cancellation beam weights on tape. Next, the program calculates the far field pattern of any of the array weights stored on tape. The user interactively specifies the number of plots on the graph and the normalization value. In this way, the output can be modified to obtain the necessary details. Finally, the computer draws the graph on a CRT and/or plotter. The following program was used to implement the above described routine.

```
100 REM##############################################################
110 REM#
120 REM#      This program places nulls in antenna patterns at
130 REM#      specified angles. Various array amplitude distributions
140 REM#      are available. The nulling can be phase only or
150 REM#      amplitude and phase. Nulls can be placed in sum patterns
160 REM#      difference patterns, or simultaneously in both. The
170 REM#      quiescent, adapted, and cancellation beam weights are
180 REM#      printed. The farfield patterns for the weights may
190 REM#      be drawn on the screen or the plotter.
200 REM#
210 REM##############################################################
220 REM
230 REM*****      Array input      *****
240 DELETE W1,W2,W3,S1,U,B,C,X1,A,Z,D,B1,Q1,F,B2,B1,A1,A2
250 PAGE
260 PRINT "NUMBER OF ELEMENTS        ";
270 INPUT N
275 N3=N/2-1
280 DIM W1(N),W2(N),W3(N),D(N),U(N3),S1(N3),X1(N3)
290 PRINT "JELEMENT SPACING (WAVELENGTHS)    ";
300 INPUT D0
310 FOR I=1 TO N
320 D(I)=2*PI*D0*(I-1-(N-1)/2)
330 NEXT I
340 GOSUB 1420
350 GOSUB 1950
360 W2=0
370 REM*****      Print quiescent weights      *****
380 GOSUB 2900
390 REM*****      Performs nulling      *****
400 DELETE J1,P0,B1,B2,A1,A2,X1,X2,W6,W7,X3,X4,M3,M4,M5,M6,M7,M8,F,F2
401 DELETE M1,M2,D1
410 PRINT "JDO YOU WANT TO NULL IN THE SUM(1) PATTERN,DIFFERENCE"
420 PRINT "PATTERN(2), OR BOTH SIMULTANEOUSLY(3)?     ";
430 INPUT Q0
440 PRINT "JJNUMBER OF JAMMERS    ";
450 INPUT N1
460 DIM J1(N1)
470 PRINT "JJAMMER LOCATIONSJ "
480 FOR I=1 TO N1
490 PRINT "JAMMER # ";I;" =       ";
500 INPUT J1(I)
510 J1(I)=J1(I)*PI/180
520 NEXT I
530 REM*****      P0 contains the phase of jamming signal      *****
540 REM*****      at each element.      *****
550 DIM P0(N,N1)
560 FOR I=1 TO N
570 FOR J=1 TO N1
580 P0(I,J)=D(I)*SIN(J1(J))
590 NEXT J
600 NEXT I
610 PRINT "JJDO YOU WANT PHASE ONLY NULLING (1) OR"
620 PRINT "AMPLITUDE AND PHASE NULLING(2)?         ";
630 INPUT Q1
635 Q9=1
636 IF Q0<3 THEN 640
637 Q9=2
640 GO TO Q1 OF 650,670
650 GOSUB 3230
660 GO TO 680
670 GOSUB 4580
680 REM*****      Inputs graph parameters      *****
690 PAGE
```

```
700 PRINT "            DATA FILES ARE:"
710 PRINT "            1. SUM QUIESCENT"
720 PRINT "            2. DIFFERENCE QUIESCENT"
730 PRINT "            3. SUM ADAPTED"
740 PRINT "            4. DIFFERENCE ADAPTED"
750 PRINT "            5. COMBINED CANCELLING BEAM FOR SUM"
760 PRINT "            6. COMBINED CANCELLING BEAM FOR DIF"
770 PRINT "            7. ADAPTED WEIGHTS"
780 PRINT "            SUM CBEAMS IN FILES 8 TO ";7+N1
790 PRINT "            DIF CBEAMS IN FILES ";8+N1;" TO ";7+2*N1
800 DELETE Q6,N9,G6,W5,W6,F,F2,M5,X,P0,A1,A2,B1,B2,A,B,C,Z,X1,W6,W7,O,S1
810 X$="DEGREES"
820 Y$="RELATIVE POWER IN DB"
825 PRINT "JDO YOU WANT JAMMER ARROWS ON THE GRAPH?(1=Y)     ";
826 INPUT N8
830 PRINT "JGRAPH LABEL ";
840 INPUT T$
850 PRINT "JSIZE OF Y SCALE IN DB      ";
860 INPUT S
870 PRINT "JLOW AND HIGH VALUE OF X SCALE     ";
880 INPUT LO,H1
890 LO=LO+90
900 H1=H1+90
910 PRINT "JHOW MANY PLOTS DO YOU WANT ON THIS GRAPH      ";
920 INPUT Q5
930 DIM Q6(Q5),N9(1000),G6(Q5)
940 PRINT "JTYPE FILE NUMBER OF DATA, NUMBER OF TRANSFORM POINTS,"
950 PRINT "AND SOLID(1),DASH(2),OR DOT(3) LINE FOR EACH PLOTJ"
960 FOR I=1 TO Q5
970 PRINT "PLOT NUMBER ";I;"     ";
980 INPUT Q6(I),N9(I),G6(I)
990 NEXT I
1000 LO=LO*PI/180
1010 H1=H1*PI/180
1020 FOR K=1 TO Q5
1030 T9=PI/(N9(K)-1)
1120 REM*****      Draws Plots      *****
1130 PRINT "JWHERE DO YOU WANT PATTERN PLOTTED?"
1140 PRINT "          SCREEN(1)"
1150 PRINT "          PLOTTER(2)"
1160 PRINT "          BOTH(3)"
1170 INPUT Q2
1171 IF Q2=1 THEN 1176
1173 GOSUB 8120
1175 REM*****      Calculates Pattern      *****
1176 GOSUB 7660
1180 IF Q2=2 THEN 1210
1190 GOSUB 9180
1200 IF Q2<3 THEN 1220
1210 GOSUB 8740
1220 GOSUB 10215
1230 MOVE X5,-S
1240 PRINT "JJJJJJJJJJJJJDO YOU WANT ANOTHER GRAPH?(1=Y)"
1250 INPUT Q3
1260 IF Q3=1 THEN 690
1270 PRINT "JJDO YOU WANT NEW WEIGHTS? (1=Y)     ";
1280 INPUT Q4
1290 IF Q4=1 THEN 240
1300 GO TO 400
1310 END
1320 REM
```

```
1330 REM#################################################
1340 REM#
1350 REM#     The low sidelobe distributions are derived using the
1360 REM#     Schelunkof unit circle.  The zeroes (U) are located on
1370 REM#     the unit circle by the angle S1 from the real axis.
1380 REM#     The product of all the zero factors is a polynomial
1390 REM#     whose coefficients are the amplitude weights.
1400 REM#
1410 REM#################################################
1420 REM
1430 PRINT "JJCHOISE OF SUM AMPLITUDE DISTRIBUTIONSJJ"
1440 PRINT "           1. UNIFORM"
1450 PRINT "           2. CHEBYCHEV  "
1460 PRINT "           3. TAYLOR"
1470 PRINT "JJTYPE NUMBER OF DISTRIBUTION YOU WANT   ";
1480 INPUT Q9
1490 GO TO Q9 OF 1510,1541,1541
1500 REM***** Uniform taper *****
1510 FOR I=1 TO N
1520 W1(I)=1
1530 NEXT I
1540 GO TO 1850
1541 PRINT "JSIDELOBE LEVEL      ";
1542 INPUT S
1543 B2=10^(S/20)
1544 B2=LOG(B2-SQR(B2^2-1))
1545 IF Q9=3 THEN 1730
1550 REM***** Chebychev taper *****
1560 U0=0.5*(EXP(B2/(N-1))+EXP(-B2/(N-1)))
1570 FOR I=1 TO N3
1580 U(I)=COS((2*I-1)*PI/(2*(N-1)))
1590 S1(I)=2*ACS(U(I)/U0)
1600 NEXT I
1610 GOSUB 2460
1620 FOR I=1 TO N
1630 W1(I)=B(I)+C(I)
1640 NEXT I
1700 GO TO 1850
1710 REM***** Taylor distribution *****
1720 REM
1730 A1=1/PI*B2
1740 PRINT "JN BAR =    ";
1750 INPUT M
1760 FOR I=1 TO M-1
1770 U(I)=M*SQR((A1^2+(I-0.5)^2)/(A1^2+(M-0.5)^2))
1780 S1(I)=2*PI*U(I)/N
1790 NEXT I
1791 FOR I=M TO N3
1792 U(I)=I
1793 S1(I)=2*PI*U(I)/N
1794 NEXT I
1800 GOSUB 2460
1810 FOR I=1 TO N
1820 W1(I)=B(I)+C(I)
1830 NEXT I
1850 RETURN
1860 REM
1870 REM#################################################
1880 REM#
1890 REM#     The difference weighting distributions have a zero on the
1900 REM#     unit circle at 0 degrees.  Otherwise they are derived
1910 REM#     in a similar manner to the sum distributions.
1920 REM#
1930 REM#################################################
1940 REM
```

```
1950 PRINT "JJCHOISE OF DIFFERENCE AMPLITUDE DISTRIBUTIONSJJ"
1960 PRINT "          1. UNIFORM"
1970 PRINT "          2. SAME MAGNITUDE AS SUM DISTRIBUTION  "
1980 PRINT "          3. BAYLISS"
1990 PRINT "JJTYPE NUMBER OF DISTRIBUTION YOU WANT   ";
2000 INPUT Q9
2010 GO TO Q9 OF 2030,2080,2110
2020 REM*****      Uniform taper      *****
2030 FOR I=1 TO N
2040 W3(I)=1
2050 NEXT I
2060 GO TO 2350
2070 REM*****      Same magnitude as sum taper    *****
2080 W3=W1
2090 GO TO 2350
2100 REM*****      Bayliss      *****
2110 X1(1)=1.5124+(S-15)*0.03752
2120 X1(2)=2.2561+(S-15)*0.026248
2130 X1(3)=3.1693+(S-15)*0.019036
2140 X1(4)=4.1264+(S-15)*0.014836
2150 A1=1.079+(S-15)*0.014836
2160 PRINT "JN BAR=  ";
2170 INPUT M
2180 B6=A1^2+M^2
2190 FOR I=1 TO M-1
2200 IF I>4 THEN 2230
2210 X1(I)=X1(I)^2
2220 GO TO 2240
2230 X1(I)=A1^2+I^2
2240 U(I)=(M+0.5)*SQR(X1(I)/B6)
2250 S1(I)=2*PI*U(I)/N
2260 NEXT I
2270 FOR I=M TO N3
2280 S1(I)=2*PI*(I+0.5)/N
2290 NEXT I
2300 GOSUB 2460
2310 FOR I=1 TO N
2320 W3(I)=ABS(C(I)-B(I))
2330 NEXT I
2350 RETURN
2360 REM
2370 REM#########################################################
2380 REM#                                                        #
2390 REM#     Finds the amplitude weights for a linear phased    #
2400 REM#     array given the location of the zeroes (s1)        #
2410 REM#     on the unit circle. Z contains the zero times      #
2420 REM#     its complex conjugate.                             #
2430 REM#                                                        #
2440 REM#########################################################
2450 REM
2460 DELETE Z,A,B,C
2470 DIM C(N+1),B(N+1),A(N+1),Z(3,N3)
2480 FOR I=1 TO N3
2490 Z(1,I)=1
2500 Z(2,I)=-2*COS(S1(I))
2510 Z(3,I)=1
2520 NEXT I
2530 B=0
2540 A=0
2550 B(1)=1
2560 B(2)=Z(2,1)
2570 B(3)=1
2580 A(1)=1
2590 A(3)=1
2600 REM
```

```
2610 REM*****     Multiplies all the Z's together. The        *****
2620 REM*****     coefficients of the resulting polynomial    *****
2630 REM*****     are the amplitude weights of the array.     *****
2640 REM
2650 FOR I=2 TO N3
2660 A(2)=Z(2,I)
2670 FOR J=1 TO 2*I+1
2680 C(J)=0
2690 FOR K=1 TO J
2700 C(J)=C(J)+A(K)*B(J+1-K)
2710 NEXT K
2720 NEXT J
2730 FOR J=1 TO 2*I+1
2740 B(J)=C(J)
2750 NEXT J
2760 NEXT I
2770 C(1)=0
2780 FOR J=2 TO N+1
2790 C(J)=B(J-1)
2800 NEXT J
2810 RETURN
2820 REM
2830 REM#############################################################
2840 REM#                                                           #
2850 REM#    The sum and difference weights are normalized, then    #
2860 REM#    recorded on tape and on the printer.                   #
2870 REM#                                                           #
2880 REM#############################################################
2890 REM
2900 DELETE B
2901 B=0
2910 B1=0
2920 FOR I=1 TO N
2930 IF B>W1(I) THEN 2950
2940 B=W1(I)
2950 IF B1>W3(I) THEN 2970
2960 B1=W3(I)
2970 NEXT I
2980 FOR I=1 TO N
2990 W1(I)=W1(I)/B
3000 W3(I)=W3(I)/B1
3010 NEXT I
3020 FOR I=1 TO N/2
3030 W3(I)=-W3(I)
3040 NEXT I
3050 FIND 1
3060 FOR I=1 TO N
3070 PRINT @33:W1(I),W2(I)
3080 NEXT I
3090 FIND 2
3100 FOR I=1 TO N
3110 PRINT @33:W3(I),W2(I)
3120 NEXT I
3130 PAGE
3140 PRINT @41:"JJJ              QUIESCENT WEIGHTSJ"
3150 PRINT @41:"           COMPLEX WEIGHTS
3160 PRINT @41:"ELEMENT        AMP        PHASE        SUM CHAN     DIF CHAN"
3170 PRINT "ELEMENT     SUM AMP      DIF AMP        PHASE"
3180 FOR I=1 TO N
3190 PRINT USING "2X,2D,2X,3( 6X, FD,4D)":I,W1(I),W3(I),W2(I)
3200 PRINT @41: USING "2X,2D,9X,1A,3(6X,FD,4D)":I,"1",W2(I),W1(I),W3(I)
3210 NEXT I
3220 RETURN
3230 DIM X1(N),X2(N),W6(N,2*N1),M1(2*N1),M2(2*N1)
3240 DIM A1(2*N1,2*N1),B1(2*N1,1),B2(2*N1,1),A2(2*N1,2*N1)
```

```
3250 REM
3260 REM**************************************************************
3270 REM*                                                              *
3280 REM*                    PHASE ONLY NULLING                        *
3290 REM*                                                              *
3300 REM*    This algorithm places nulls in the sum, difference,       *
3310 REM*    or both patterns by adjusting only the phase shifters.    *
3320 REM*    The method yields only approximate results because        *
3330 REM*    of the linear approximation to the expronential phase     *
3340 REM*    term.                                                     *
3350 REM*                                                              *
3360 REM**************************************************************
3370 REM
3380 REM*****       B1 contains the quiescent far field value      *****
3390 REM*****          in the directions of the jammers.           *****
3410 B1=0
3420 B2=0
3430 FOR J=1 TO N1
3440 FOR I=1 TO N
3450 GO TO QO OF 3460,3480,3500
3460 B1(J,1)=B1(J,1)+W1(I)*COS(PO(I,J))
3470 GO TO 3520
3480 B1(J,1)=B1(J,1)-W3(I)*SIN(PO(I,J))
3490 GO TO 3520
3500 B1(J,1)=B1(J,1)+W1(I)*COS(PO(I,J))
3510 B1(J+N1,1)=B1(J+N1,1)-W3(I)*SIN(PO(I,J))
3520 NEXT I
3530 NEXT J
3550 REM*****   A1 - REAL
3560 REM*****   A1 Contains A times A transposed, where A is an    *****
3570 REM*****   array of N1 vectors. Each vector contains the      *****
3580 REM*****   phase terms of the jammer locations at each element *****
3590 A1=0
3600 A2=0
3610 FOR I=1 TO N1
3620 FOR J=1 TO N1
3630 FOR K=1 TO N
3650 GO TO QO OF 3660,3680,3700
3660 A1(I,J)=A1(I,J)+W1(K)^2*SIN(PO(K,I))*SIN(PO(K,J))
3670 GO TO 3740
3680 A1(I,J)=A1(I,J)+W3(K)^2*COS(PO(K,I))*COS(PO(K,J))
3690 GO TO 3740
3700 A1(I,J)=A1(I,J)+W1(K)^2*SIN(PO(K,I))*SIN(PO(K,J))
3710 A1(I,J+N1)=A1(I,J+N1)+W1(K)*W3(K)*SIN(PO(K,I))*COS(PO(K,J))
3720 A1(I+N1,J)=A1(I+N1,J)+W1(K)*W3(K)*COS(PO(K,I))*SIN(PO(K,J))
3730 A1(I+N1,J+N1)=A1(I+N1,J+N1)+W3(K)^2*COS(PO(K,I))*COS(PO(K,J))
3740 NEXT K
3750 NEXT J
3760 NEXT I
3870 GOSUB 6375
3930 REM*****   Computes the weights for each cancelling beam      *****
3940 REM*****   This part completes the least square solution      *****
3950 REM*****   to the problem.                                    *****
3960 DIM X3(N),X4(N),M1(2*N1),M2(2*N1),M3(N),M4(N),M5(N),M6(N)
3970 DIM M7(N),M8(N)
3980 X1=0
3985 X2=0
3990 W6=0
4000 W7=0
4010 X3=0
4020 X4=0
4030 FOR J=1 TO N1
4040 FOR I=1 TO N
4070 GO TO QO OF 4080,4100,4120
4080 W6(I,J)=W1(I)*B1(J,1)*SIN(PO(I,J))
```

```
4090 GO TO 4150
4100 W6(I,J+N1)=W3(I)*B1(J,1)*COS(P0(I,J))
4110 GO TO 4140
4120 W6(I,J)=B1(J,1)*W1(I)*SIN(P0(I,J))
4130 W6(I,J+N1)=B1(J+N1,1)*W3(I)*COS(P0(I,J))
4140 X2(I)=X2(I)+W6(I,J+N1)
4145 IF Q0=2 THEN 4160
4150 X1(I)=X1(I)+W6(I,J)
4160 NEXT I
4170 NEXT J
4180 REM*****        STORES COMBINED BEAM        *****
4190 IF Q0<2 THEN 4285
4240 FIND 6
4250 FOR I=1 TO N
4260 PRINT @33:W3(I)*X2(I),PI/2
4270 NEXT I
4280 X1=X1+X2
4285 IF Q0=2 THEN 4330
4290 FIND 5
4300 FOR I=1 TO N
4310 PRINT @33:W1(I)*X1(I),PI/2
4320 NEXT I
4330 FOR J=1 TO N1
4340 FIND 7+J
4350 FOR I=1 TO N
4360 PRINT @33:W1(I)*W6(I,J),PI/2
4370 NEXT I
4380 NEXT J
4381 FOR J=1 TO N1
4382 FIND 7+N1+J
4383 FOR I=1 TO N
4384 PRINT @33:W6(I,J)*W3(I),PI/2
4385 NEXT I
4386 NEXT J
4390 REM*****        sum weights        *****
4400 FIND 3
4410 FOR I=1 TO N
4420 PRINT @33:W1(I),X1(I)
4430 NEXT I
4440 REM*****        Difference weights        *****
4450 FIND 4
4460 FOR I=1 TO N
4470 PRINT @33:W3(I),X1(I)
4480 NEXT I
4490 PRINT @41:"JJJ                    ADAPTED WEIGHTSJ"
4500 PRINT @41:"Element    SUM CHAN    DIF CHAN        PHASE   "
4510 FOR I=1 TO N
4520 PRINT @41: USING "2X,2D,2X,3(5X,FD.5D)":I,W1(I),W3(I),X1(I)
4530 NEXT I
4540 RETURN
4550 REM*****   B1 and B2 contains the far field value of   *****
4560 REM*****   the quiescent array in the directions of    *****
4570 REM*****   the Jammers.                                 *****
4580 DIM B1(2*N1,1),B2(2*N1,1),A1(2*N1,2*N1),A2(2*N1,2*N1)
4585 Z5=Q9-1
4586 B1=0
4590 B2=0
4600 FOR J=1 TO N1
4610 FOR I=1 TO N
4620 IF Q0=2 THEN 4680
4670 B1(J,1)=B1(J,1)-W1(I)*COS(P0(I,J))
4675 IF Q0=1 THEN 4690
4680 B2(J+N1*Z5,1)=B2(J+N1*Z5,1)-W3(I)*SIN(P0(I,J))
4690 NEXT I
4700 NEXT J
```

```
4710 REM
4720 REM*****   A1 - real                                              *****
4730 REM*****   A2 - Imaginary                                         *****
4740 REM*****   A1 and A2 contain A times the complex conjugate        *****
4750 REM*****   of A transposed where A is an array of N1 complex      *****
4760 REM*****   vectors.  Each vector contains the phase terms         *****
4770 REM*****   of the jammer location at each element.
4780 A1=0
4790 A2=0
4800 FOR I=1 TO N1
4810 FOR J=1 TO N1
4820 FOR K=1 TO N
4830 P2=PO(K,I)-PO(K,J)
4840 IF Q0=2 THEN 4920
4890 A1(I,J)=A1(I,J)+W1(K)^2*COS(P2)
4895 IF Q0=1 THEN 4970
4900 A1(I,J+N1)=A1(I,J+N1)+W1(K)*W3(K)*COS(P2)
4910 A1(I+N1,J)=A1(I,N1+J)
4920 A1(I+N1*Z5,J+N1*Z5)=A1(I+N1*Z5,J+N1*Z5)+W3(K)^2*COS(P2)
4925 IF Q0=2 THEN 4970
4930 A2(I,J)=A2(I,J)+W1(K)^2*SIN(P2)
4940 A2(I+N1,J)=A2(I+N1,J)+W3(K)*W1(K)*SIN(P2)
4950 A2(I,J+N1)=A2(I+N1,J)
4960 A2(I+N1,J+N1)=A2(I+N1,J+N1)+W3(K)^2*SIN(P2)
4970 NEXT K
4980 NEXT J
4990 NEXT I
5080 GOSUB 6375
5140 REM*****  Computes the weights for each cancelling beam     *****
5150 REM*****  This part completes the least square solution     *****
5160 REM*****  to the problem.
5180 DIM X3(N),X4(N),M1(2*N1),M2(2*N1),M3(N),M4(N),M5(N),M6(N)
5190 DIM M7(N),M8(N),X1(N),X2(N),W6(N,2*N1),W7(N,2*N1)
5200 X1=0
5210 X2=0
5220 W6=0
5230 W7=0
5240 X3=0
5250 X4=0
5400 FOR J=1 TO N1
5410 FOR I=1 TO N
5420 P2=PO(I,J)
5430 J2=W1(I)*(COS(P2)*B1(J,1)+SIN(P2)*B2(J,1))
5440 J3=W3(I)*(COS(P2)*B1(J+N1*Z5,1)+SIN(P2)*B2(J+N1*Z5,1))
5450 J4=W1(I)*(-SIN(P2)*B1(J,1)+COS(P2)*B2(J,1))
5460 J5=W3(I)*(-SIN(P2)*B1(J+N1*Z5,1)+COS(P2)*B2(J+N1*Z5,1))
5470 REM******      X1+X2=alpha=real part of wght perturbations         *****
5480 REM******      X3+X4=beta=imag part of wght perturbations          *****
5490 X1(I)=X1(I)+J2
5500 X3(I)=X3(I)+J4
5510 X2(I)=X2(I)+J3
5520 X4(I)=X4(I)+J5
5530 REM*****     W6-Amplitude of individual cbeams         *****
5540 REM*****     W7-Phase of individual cbeams             *****
5550 W6(I,J)=W1(I)*SQR(J2^2+J4^2)
5560 W7(I,J)=ATN(J4/J2)+W2(I)
5570 IF J2>0 THEN 5600
5580 W7(I,J)=W7(I,J)+PI
5600 W6(I,J+N1*Z5)=W3(I)*SQR(J3^2+J5^2)
5610 W7(I,J+N1*Z5)=ATN(J5/J3)+W2(I)
5620 IF J3>0 THEN 5640
5630 W7(I,J+N1*Z5)=W7(I,J+N1*Z5)+PI
5640 NEXT I
5650 NEXT J
5660 REM*****     Amp and phase of individual cbeams stored       *****
```

```
5670 FOR J=1 TO Q9*N1
5680 FIND 7+J
5690 FOR I=1 TO N
5700 PRINT @33:W6(I,J),W7(I,J)
5710 NEXT I
5720 NEXT J
5730 REM
5740 REM*****    M3 - Amplitude for combined sum cbeam        *****
5750 REM*****    M4 - Phase           "         "             *****
5760 REM*****    M5 - Amplitude for combined difference cbeam *****
5770 REM*****    M6 - Phase           "         "             *****
5780 REM*****    M7 - Amplitude of adapted weights            *****
5790 REM*****    M8 - Phase           "         "             *****
5800 GO TO Q0 OF 5810,5840,5860
5810 X2=X1
5820 X4=X3
5830 GO TO 5860
5840 X1=X2
5850 X3=X4
5860 FOR I=1 TO N
5870 M3(I)=W1(I)*SQR(X1(I)^2+X3(I)^2)
5880 M4(I)=ATN(X3(I)/X1(I))
5890 IF X1(I)>0 THEN 5910
5900 M4(I)=M4(I)+PI
5910 M5(I)=W3(I)*SQR(X2(I)^2+X4(I)^2)
5920 M6(I)=ATN(X4(I)/X2(I))
5930 IF X2(I)>0 THEN 5950
5940 M6(I)=M6(I)+PI
5950 GO TO Q0 OF 5955,5970,5985
5955 D5=X1(I)+1
5960 D6=X3(I)
5965 GO TO 5995
5970 D5=X2(I)+1
5975 D6=X4(I)
5980 GO TO 5995
5985 D5=X1(I)+X2(I)+1
5990 D6=X3(I)+X4(I)
5995 M7(I)=SQR(D5^2+D6^2)
6000 M8(I)=ATN(D6/D5)
6005 IF D5>0 THEN 6010
6007 M8(I)=M8(I)+PI
6010 NEXT I
6020 REM*****    Sum weights for combined cbeams    *****
6030 FIND 5
6040 FOR I=1 TO N
6050 PRINT @33:M3(I),M4(I)
6060 NEXT I
6070 REM*****    Difference weights for combined cbeams    *****
6080 FIND 6
6090 FOR I=1 TO N
6100 PRINT @33:M5(I),M6(I)
6110 NEXT I
6120 REM*****    Adapted weights    *****
6130 FIND 7
6140 FOR I=1 TO N
6150 PRINT @33:M7(I),M8(I)
6160 NEXT I
6170 REM*****    Sum weights    *****
6180 FIND 3
6190 FOR I=1 TO N
6200 PRINT @33:W1(I)*M7(I),M8(I)
6210 NEXT I
6220 REM*****    Difference weights    *****
6230 FIND 4
6240 FOR I=1 TO N
```

```
6250 PRINT @33:W3(I)*M7(I),M8(I)
6260 NEXT I
6270 PRINT @41:'JJJ                    ADAPTED WEIGHTSJ'
6280 PRINT @41:'ELEMENT       AMP         PHASE       SUM CHAN     DIF C...'
6290 FOR I=1 TO N
6300 K7=W1(I)*M7(I)
6310 K8=W3(I)*M7(I)
6320 PRINT @41: USING "2X,2D,2X,4(5X,F6.5D)":I,M7(I),M8(I),K7,K8
6330 NEXT I
6340 RETURN
6350 REM##############################################################
6351 REM#
6352 REM#    This subroutine solves the complex equation A.X=B.  The
6353 REM#    solution x is stored in B, where B1=real(x) and B2=
6354 REM#    imag(x).  A1 is real and A2 is imaginary.
6355 REM#
6356 REM##############################################################
6375 N0=N1*Q9
6380 M=1
6590 REM SOLVE SYSTEM ROUTINE
6610 DELETE P8,P9
6620 DIM P9(N),P8(N),D1(2),L7(2)
6630 REM INITIALIZE DETERMINANT AND PIVOT ELEMENT ARRAY
6640 D1(1)=1
6650 D1(2)=0
6660 P9=0
6670 REM PERFORM SUCCESSIVE PIVOT OPERATIONS (GRAND LOOP)
6680 FOR P3=1 TO N0
6690 REM SEARCH FOR PIVOT ELEMENT AND EXTEND DETERMINANT PRODUCT
6700 P5=0
6710 FOR P1=1 TO N0
6720 IF P9(P1)<>0 THEN 6810
6730 FOR P2=1 TO N0
6740 IF P9(P2)<>0 THEN 6800
6750 P4=A1(P1,P2)^2+A2(P1,P2)^2
6760 IF P4<P5 THEN 6800
6770 P6=P1
6780 P7=P2
6790 P5=P4
6800 NEXT P2
6810 NEXT P1
6820 P8(P3)=4096*P6+P7
6830 P1=P6
6840 L7(1)=A1(P1,P7)
6850 L7(2)=A2(P1,P7)
6860 L1=D1(1)
6870 D1(1)=L7(1)*D1(1)-L7(2)*D1(2)
6880 D1(2)=L7(1)*D1(2)+L7(2)*L1
6890 REM   CHECK FOR SINGULAR MATRIX
6910 P9(P7)=P5
6920 REM INTERCHANGE ROWS TO PUT PIVOT ELEMENT ON DIAGONAL
6930 IF P6=P7 THEN 7140
6940 D1(1)=-D1(1)
6950 D1(2)=-D1(2)
6960 FOR P2=1 TO N0
6970 L1=A1(P1,P2)
6980 L2=A2(P1,P2)
6990 A1(P1,P2)=A1(P7,P2)
7000 A2(P1,P2)=A2(P7,P2)
7010 A1(P7,P2)=L1
7020 A2(P7,P2)=L2
7030 NEXT P2
7040 IF M<=0 THEN 7140
7050 FOR P2=1 TO M
7060 L1=B1(P1,P2)
```

```
7070 L2=B2(P1,P2)
7080 B1(P1,P2)=B1(P7,P2)
7090 B2(P1,P2)=B2(P7,P2)
7100 B1(P7,P2)=L1
7110 B2(P7,P2)=L2
7120 NEXT P2
7130 REM DIVIDE PIVOT ROW BY PIVOT ELEMENT
7140 L1=L7(1)
7150 L2=L7(2)
7160 L8=1/(L1*L1+L2*L2)
7170 FOR P2=1 TO N0
7180 IF P2<>P7 THEN 7210
7190 A1(P7,P2)=1
7200 A2(P7,P2)=0
7210 L3=A1(P7,P2)
7220 A1(P7,P2)=(A1(P7,P2)*L1+A2(P7,P2)*L2)*L8
7230 A2(P7,P2)=(A2(P7,P2)*L1-L3*L2)*L8
7240 NEXT P2
7250 IF M<=0 THEN 7320
7260 FOR P2=1 TO M
7270 L3=B1(P7,P2)
7280 B1(P7,P2)=(B1(P7,P2)*L1+B2(P7,P2)*L2)*L8
7290 B2(P7,P2)=(B2(P7,P2)*L1-L3*L2)*L8
7300 NEXT P2
7310 REM REDUCE NON-PIVOT ROWS
7320 FOR P1=1 TO N0
7330 IF P1=P7 THEN 7480
7340 L1=A1(P1,P7)
7350 L2=A2(P1,P7)
7360 A1(P1,P7)=0
7370 A2(P1,P7)=0
7380 FOR P2=1 TO N0
7390 L3=A1(P7,P2)
7400 A1(P1,P2)=A1(P1,P2)-(A1(P7,P2)*L1-A2(P7,P2)*L2)
7410 NEXT P2
7420 IF M<=0 THEN 7480
7430 FOR P2=1 TO M
7440 L3=B1(P7,P2)
7450 B1(P1,P2)=B1(P1,P2)-(B1(P7,P2)*L1-B2(P7,P2)*L2)
7460 B2(P1,P2)=B2(P1,P2)-(L3*L2+B2(P7,P2)*L1)
7470 NEXT P2
7480 NEXT P1
7490 NEXT P3
7500 DELETE P8,P9,D1,L1,L2,L3,L8,L9
7510 RETURN
7520 REM#################################################
7530 REM#
7540 REM#              TRANSFORM TO FAR FIELD
7550 REM#
7560 REM#    This routine takes the complex elementPweights
7570 REM#    and calculates the the far field pattern.
7580 REM#
7590 REM#        D-NORMALIZED ELEMENT SPACING
7600 REM#        F-Field amplitude
7610 REM#        X-Real part of weights
7620 REM#        Y-Imaginary part of weights
7630 REM#
7640 REM#################################################
7650 REM
7660 DIM F(800),C9(5)
7671 DELETE W5,W6
7675 DIM W5(N),W6(N)
7680 FOR K=1 TO Q5
7681 REM*****    Inputs weights to be plotted    *****
7682 C9(K)=(H1-L0)/(N9(K)-1)
7683 FIND Q6(K)
```

```
7685 FOR I=1 TO N
7686 INPUT @33:W5(I),W6(I)
7687 NEXT I
7689 FIND 19+K
7690 FOR I=1 TO N9(K)
7700 H=COS(L0+(I-1)*C9(K))
7710 X=0
7720 Y=0
7730 FOR J=1 TO N
7740 Z=W6(J)-D(J)*H
7750 X=X+W5(J)*COS(Z)
7760 Y=Y+W5(J)*SIN(Z)
7770 NEXT J
7780 A=SIN(L0+(I-1)*C9(K))
7790 F(I)=X^2+Y^2
7800 NEXT I
7810 IF K>1 THEN 7890
7820 REM*****     Finds normalization factor, normalizes the      *****
7830 REM*****     pattern, and converts to db.                    *****
7840 B=0
7850 FOR I=1 TO N9(K)
7860 IF ABS(F(I))<B THEN 7880
7870 B=ABS(F(I))
7880 NEXT I
7890 FOR I=1 TO N9(K)
7900 F(I)=ABS(F(I)/B)
7910 IF F(I)>10^(-S/10) THEN 7930
7920 F(I)=10^(-S/10)
7930 F(I)=10*LGT(ABS(F(I)))
7935 PRINT @33:F(I)
7940 NEXT I
7945 GOSUB 10010
7950 NEXT K
7960 RETURN
7970 REM
7980 REM########################################################################
7990 REM#                                                                      #
8000 REM#      Graphs and labels axis on the plotter.                          #
8010 REM#                                                                      #
8020 REM#            X5 - lower X value                                        #
8030 REM#            Y5 - upper X value                                        #
8040 REM#            M5 - middle X value                                       #
8050 REM#                                                                     #
8060 REM#      The X axis has tic marks every 10 degrees for                   #
8070 REM#      Y5-X5>140 degrees and every 5 degrees for                       #
8080 REM#      Y5-X5<140 degrees.                                              #
8090 REM#                                                                      #
8100 REM########################################################################
8110 REM
8120 X5=INT(L0*180/PI+0.1)
8130 Y5=INT(H1*180/PI+0.1)
8135 G8=(Y5-X5)*0.005
8140 PRINT @1,32:"A"
8150 PRINT @1,32:"N"
8160 M5=(Y5-X5)/2+X5
8170 VIEWPORT 20,110,15,80
8180 PRINT @1,32:"A"
8190 WINDOW X5,Y5,-S,0
8200 IF Y5-X5>140 THEN 8230
8210 A6=5
8220 GO TO 8240
8230 A6=10
8240 AXIS @1:A6,-S/10,Y5,0
8250 AXIS @1:A6,-S/10,X5,-S
8260 REM*****     Labels X axis     *****
```

```
8270 MOVE @1:M5-G8,-S
8280 PRINT @1:"JJJ";
8290 FOR I=1 TO LEN(X$)/2
8300 PRINT @1:"H";
8310 NEXT I
8320 PRINT @1:X$
8330 MOVE @1:X5-4*G8*INT(0.9+ABS((90-X5)/M5)),-S-0.01*S
8340 PRINT @1:"J";X5-90;
8350 MOVE @1:M5-2*G8*INT(ABS(M5/100))-G8,-S-0.01*S
8360 PRINT @1:"J";M5-90;
8370 MOVE @1:Y5-2*G8,-S-0.01*S
8380 PRINT @1:"J";Y5-90;
8390 REM*****     Labels Y axis     *****
8400 MOVE @1:X5,-S/2-0.02*S
8410 PRINT @1:"HHHHHH";
8420 FOR I=1 TO LEN(Y$)/2
8430 PRINT @1:"K";
8440 NEXT I
8450 FOR I=1 TO LEN(Y$)
8460 Z$=SEG(Y$,I,1)
8470 PRINT @1:Z$;"HJ";
8480 NEXT I
8490 MOVE @1:X5-G8,-S*0.01
8500 PRINT @1:"H0"
8510 MOVE @1:X5-G8,-S/2-S*0.01
8520 PRINT @1:"HHH";-S/2
8530 MOVE @1:X5-G8,-S-0.01*S
8540 PRINT @1:"HHH";-S
8550 REM*****     Prints graph title     *****
8560 REM
8570 MOVE @1:M5-G8,0
8580 PRINT @1:"KK";
8590 FOR I=1 TO LEN(T$)/2
8600 PRINT @1:"H";
8610 NEXT I
8620 PRINT @1:T$
8635 IF N8<>1 THEN 8735
8640 REM*****     Places arrow in jammer direction     *****
8645 VIEWPORT 20,110,8.5,80
8647 WINDOW X5,Y5,-S-S/10,0
8650 FOR I=1 TO N1
8660 J3=J1(I)*180/PI
8670 MOVE @1:90+J3,-S/8
8680 DRAW @1:90+J3,-S/6
8690 DRAW @1:90+(Y5-X5)/180+J3,-S*0.16
8700 MOVE @1:90+J3,-S/6
8710 DRAW @1:90-(Y5-X5)/180+J3,-S*0.16
8712 MOVE @1:90+J3,-S
8713 DRAW @1:90+J3,-S-S/24
8714 MOVE @1:90+J3,-S
8715 DRAW @1:90+(Y5-X5)/180+J3,-S-S/80
8716 MOVE @1:90+J3,-S
8717 DRAW @1:90-(Y5-X5)/180+J3,-S-S/80
8720 NEXT I
8730 MOVE @1:X5,-S
8735 RETURN
8740 REM
8750 REM*****     Draws far field pattern on plotter     *****
8755 IF Q2=3 THEN 8770
8760 PRINT @1,32:"A"
8761 PRINT @1,32:"N"
8762 VIEWPORT 20,110,15,80
8763 PRINT @1,32:"A"
8764 WINDOW X5,Y5,-S,0
8770 FOR K=1 TO Q5
```

```
8775 C8=C9(K)*180/PI
8785 FIND 19+K
8787 INPUT @33:F1
8788 MOVE @1:X5,F1
8789 FIND 19+K
8800 GO TO G6(K) OF 8820,8860,8950
8810 REM*****      Solid line      *****
8820 PRINT @1,32:"BL",0
8840 GO TO 8975
8850 REM*****      Dash line       *****
8860 PRINT @1,32:"BL";1
8870 PRINT @1,32:"BD";1;1
8880 PRINT @1,32:"BS";1,2
8910 GO TO 8975
8940 REM*****      Dot line        *****
8950 PRINT @1,32:"BL",1
8960 PRINT @1,32:"BD";0;0;0;1
8970 PRINT @1,32:"BS";1,2
8975 FOR I=1 TO N9(K)
8977 INPUT @33:F1
8990 DRAW @1:X5+(I-1)*C8,F1
9000 NEXT I
9010 NEXT K
9020 RETURN
9050 REM#####################################################
9060 REM#
9070 REM#    Graphs and labels axes on screen.
9080 REM#
9090 REM#         X5 - Lower X value
9100 REM#         Y5 - Upper X value
9110 REM#         M5 - Middle X value
9120 REM#
9130 REM#    Y5-X5>140 degrees then tic interval = 10 degrees
9140 REM#    Y5-X5<140 degrees then tic interval =  5 degrees
9150 REM#
9160 REM#####################################################
9170 REM
9180 PAGE
9190 X5=INT(L0*180/PI+0.1)
9200 Y5=INT(H1*180/PI+0.1)
9205 G8=(Y5-X5)*0.005
9210 M5=(Y5-X5)/2+X5
9220 WINDOW X5,Y5,-S,0
9230 VIEWPORT 11,110,28,90
9240 IF Y5-X5>140 THEN 9270
9250 A6=5
9260 GO TO 9280
9270 A6=10
9280 AXIS A6,-S/10,Y5,0
9290 AXIS A6,-S/10,X5,-S
9300 REM*****      Labels X axis      *****
9310 MOVE M5-G8,-S
9320 PRINT "JJJ";
9330 FOR I=1 TO LEN(X$)/2
9340 PRINT "H";
9350 NEXT I
9360 PRINT X$
9370 MOVE X5-2*G8*INT(0.9+ABS((90-X5)/M5)),-S-0.01*S
9380 PRINT "J";X5-90;
9390 MOVE M5-2*G8*INT(ABS(M5/100))-G8,-S-0.01*S
9400 PRINT "J";M5-90;
9410 MOVE Y5,-S-0.01*S
9420 PRINT "JH";Y5-90;
9430 REM*****      Labels Y axis      *****
9440 MOVE X5,-S/2-0.02*S
```

```
9450 PRINT "HHHHHH";
9460 FOR I=1 TO LEN(Y$)/2
9470 PRINT "K";
9480 NEXT I
9490 FOR I=1 TO LEN(Y$)
9500 Z$=SEG(Y$,I,1)
9510 PRINT Z$;"HJ";
9520 NEXT I
9530 MOVE X5-G8,-S*0.02
9540 PRINT "H0"
9550 MOVE X5-G8,-S/2-S*0.02
9560 PRINT "HHH";-S/2
9570 MOVE X5-G8,-S-0.01*S
9580 PRINT "HHH";-S
9590 REM*****        Prints graph title       *****
9600 MOVE M5-G8,0
9610 PRINT "KK";
9620 FOR I=1 TO LEN(T$)/2
9630 PRINT "H";
9640 NEXT I
9650 PRINT T$
9660 IF N8<>1 THEN 9760
9661 VIEWPORT 11,110,20,90
9662 WINDOW X5,Y5,-S-S/10,0
9665 REM*****        Places arrow in Jammer locations       *****
9668 FOR I=1 TO N1
9671 J3=J1(I)*180/PI
9674 MOVE 90+J3,-S/8
9677 DRAW 90+J3,-S/6
9680 DRAW 90+(Y5-X5)/180+J3,-S*0.16
9683 MOVE 90+J3,-S/6
9686 DRAW 90-(Y5-X5)/180+J3,-S*0.16
9689 MOVE 90+J3,-S
9692 DRAW 90+J3,-S-S/24
9695 MOVE 90+J3,-S
9698 DRAW 90+(Y5-X5)/180+J3,-S-S/80
9701 MOVE 90+J3,-S
9704 DRAW 90-(Y5-X5)/180+J3,-S-S/80
9707 NEXT I
9760 MOVE X5,-S
9770 REM*****        Graphs pattern of screen       *****
9775 WINDOW X5,Y5,-S,0
9778 VIEWPORT 11,110,28,90
9790 FOR K=1 TO Q5
9792 C8=C9(K)*180/PI
9795 FIND 19+K
9800 MOVE X5,-S
9810 FOR I=1 TO N9(K)
9815 INPUT @33:F1
9820 GO TO G6(K) OF 9840,9870,9930
9830 REM*****        Solid line       *****
9840 DRAW X5+(I-1)*C8,F1
9850 GO TO 9950
9860 REM*****        dash line       *****
9870 IF I/2=INT(I/2) THEN 9900
9880 DRAW X5+(I-1)*C8,F1
9890 GO TO 9950
9900 MOVE X5+(I-1)*C8,F1
9910 GO TO 9950
9920 REM*****        Dot line       *****
9930 MOVE X5+(I-1)*C8,F1
9940 DRAW X5+(I-1)*C8,F1
9950 NEXT I
9960 NEXT K
9965 RETURN
```

```
9970 REM********************************************************************
9980 REM*
9990 REM*    This routine calculates the farfield antenna pattern
9991 REM*    exactly at the jammer locations and prints the value
9992 REM*    on the screen. The patterns are normalized to the
9993 REM*    value (B) as the patterns drawn above.
9994 REM*
9995 REM********************************************************************
10010 DIM F2(Q5,N1)
10060 FOR I=1 TO N1
10070 H=COS(PI/2+J1(I))
10080 X=0
10090 Y=0
10100 FOR J=1 TO N
10110 Z=W6(J)-D(J)*H
10120 X=X+W5(J)*COS(Z)
10130 Y=Y+W5(J)*SIN(Z)
10140 NEXT J
10150 F2(K,I)=X^2+Y^2
10160 IF F2(K,I)<>0 THEN 10190
10170 F2(K,I)=1.0E-20
10190 F2(K,I)=10*LGT(ABS(F2(K,I)/B))
10200 NEXT I
10210 RETURN
10215 MOVE X5,-S
10230 PRINT @41:"JJJJ";
10231 PRINT "JJJJ";
10240 PRINT "       ";
10250 PRINT @41:"         ";
10260 FOR I=1 TO N1
10270 PRINT "   JAM=";INT(J1(I)*180/PI+0.1);
10280 PRINT @41:"   JAM=";INT(J1(I)*180/PI+0.1);
10290 NEXT I
10300 PRINT "J"
10310 PRINT @41:"J"
10320 FOR K1=1 TO Q5
10330 PRINT "PLOT # ";K1;"      ";
10340 PRINT @41:"PLOT # ";K1;"      ";
10350 FOR I=1 TO N1
10360 PRINT "      ";INT(F2(K1,I));
10370 PRINT @41:"      ";INT(F2(K1,I));
10380 NEXT I
10390 PRINT "  "
10400 PRINT @41:"  "
10410 NEXT K1
10420 RETURN
```

While the invention has been described in its presently preferred embodiments, it is understood that the words which have been used are words of description rather than words of limitation and that changes with the purview of the appended claims may be made without departing from the scope and spirit of the invention in its broad aspects.

What is claimed is:

1. In a monopulse radar system having: a phased array antenna, said phased array antenna comprising a multiplicity of equally spaced antenna elements, a sum channel means and a difference channel means connected to receive radar signals from said antenna and transmit sum and difference signals to radar receiver means, and computer means, said computer means generating interference source direction data $\theta_m$ from received radar signals; the improvement residing in nulling means for effecting, simultaneous nulling in antenna sum and difference patterns, said nulling means comprising an adaptive weight, $w_n$, associated with each antenna element, each said adaptive weight being represented by $w_n = 1 + \alpha_n + j\beta_n$, and means for setting each said adaptive weight, $w_n$, in response to data developed by said computer, said computer developing weight settings in accordance with the functions $\alpha_n = Re[A^+(AA^+)^{-1}B]$ $\beta_n = Im[A^+(AA^+)^{-1}B]$ wherein $$A = \begin{bmatrix} a_1 e^{jd_1(u_1 - u_s)} & & \ldots & & a_N e^{jd_N(u_1 - u_s)} \\ \vdots & & & & \vdots \\ a_1 e^{jd_1(u_M - u_s)} & & \ldots & & a_N e^{jd_N(u_M - u_s)} \\ b_1 e^{jd_1(u_1 - u_s)} & & \ldots & & b_N e^{jd_N(u_1 - u_s)} \\ \vdots & & & & \vdots \\ b_1 e^{jd_z(u_M - u_s)} & & \ldots & & b_N e^{jd_N(u_M - u_s)} \end{bmatrix}$$

$$B = \begin{bmatrix} -\sum_{n=1}^{N} a_n \cos[d_n(u_1 - u_s)] \\ \vdots \\ -\sum_{n=1}^{N} a_n \cos[d_n(u_M - u_s)] \\ -j \sum_{n=1}^{N} b_n \sin[d_n(u_1 - u_s)] \\ \vdots \\ -j \sum_{n=1}^{N} b_n \sin[d_n(u_M - u_s)] \end{bmatrix}$$

N = number of elements
n = elements number from 1 to N
$a_n$ = sum amplitude weight
$b_n$ = difference amplitude weight
k = propagation constant = $2\pi/\lambda$
$\lambda$ = wavelength
$d_n = n - (N+1)/2$
M = number of jammers
m = jammer number from 1 to M $u_m = \sin \theta_m$,
$\theta_m$ = direction of $m^{th}$ jammer relative to boresight,
$u_s = \sin \theta_s$, and
$\theta_s$ = direction of desired signal relative to boresight.

2. In a monopulse radar system having: a phased array antenna, said phased array antenna comprising a multiplicity of equally spaced antenna elements, sum channel means and difference channel means connected to receive radar signals from said antenna and transmit sum and difference signals to radar receiver means, and computer means, said computer means generating interference source direction data $\theta_m$ from received radar signals; the improvement residing in nulling means for effecting simultaneous nulling in antenna sum and difference patterns said nulling means comprising:

an adaptive weight, $w_n$ having amplitude and phase components associated with each antenna element; and means for setting the phase component $\theta_n$ of said adaptive weight, $w_n$ in response to data developed by said computer, said computer developing weight settings in accordance with the function $$\phi_n = \sum_{m=1}^{M} c_m a_n \sin[d_n(u_m - u_s)] + \sum_{m=M+1}^{2M} c_m b_n \cos[d_n(u_m - u_s)]$$

wherein
M = number of jammers
m = Jammer number from 1 to M
$c_m$ are elements of the matrix C matrix $C = (AA^T)^{-B}$
$a_n$ = sum amplitude weight
$d_n = n - (N+1)/2$
N = number of elements
$b_n$ = difference amplitude weight,
$u_m = \sin \theta_m$
$\theta_m$ = direction of $m^{th}$ jammer relative to boresight
$u_s = \sin \theta_s$, and
$\theta_s$ = direction of desired signal relative to boresight.

* * * * *

UNITED STATES PATENT AND TRADEMARK OFFICE
CERTIFICATE OF CORRECTION

PATENT NO. : 4,555,706
DATED : November 26, 1985
INVENTOR(S) : Randy L. Haupt

It is certified that error appears in the above-identified patent and that said Letters Patent is hereby corrected as shown below:

On the title page Insert assignee

-- The United States of America as represented by
the Secretary of the Air Force, Washington, D.C. --

Signed and Sealed this

Sixteenth Day of September 1986

[SEAL]

Attest:

DONALD J. QUIGG

Attesting Officer  Commissioner of Patents and Trademarks